(12) United States Patent
Okumura et al.

(10) Patent No.: US 7,770,916 B2
(45) Date of Patent: Aug. 10, 2010

(54) INTERIOR MATERIAL AND LASER BEAM PROCESSING METHOD FOR THE SAME

(75) Inventors: Tokuji Okumura, Hasuda (JP);
Kazushiro Wakabayashi, Tsu (JP);
Mitsutaka Igaue, Utsunomiya (JP);
Hisashi Masuda, Koganei (JP); Yutaka Ebato, Utsunomiya (JP); Masahiko Nakayama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 11/885,875

(22) PCT Filed: Mar. 6, 2006

(86) PCT No.: PCT/JP2006/304299

§ 371 (c)(1),
(2), (4) Date: Sep. 7, 2007

(87) PCT Pub. No.: WO2006/095699

PCT Pub. Date: Sep. 14, 2006

(65) Prior Publication Data
US 2008/0203708 A1    Aug. 28, 2008

(30) Foreign Application Priority Data
Mar. 7, 2005 (JP) ............................. 2005-062041
Mar. 7, 2005 (JP) ............................. 2005-062161
Mar. 7, 2005 (JP) ............................. 2005-062164

(51) Int. Cl.
*B60R 21/20* (2006.01)

(52) U.S. Cl. ..................... 280/728.3; 280/731; 280/732

(58) Field of Classification Search ............. 280/728.3, 280/731, 732
See application file for complete search history.

(56) References Cited

U.S. PATENT DOCUMENTS

| | | | |
|---|---|---|---|
| 5,143,401 A | 9/1992 | Zushi | |
| 5,882,572 A | 3/1999 | Lutze et al. | |
| 5,883,356 A * | 3/1999 | Bauer et al. | 219/121.62 |
| 6,267,918 B1 * | 7/2001 | Bauer | 264/400 |
| 6,294,124 B1 * | 9/2001 | Bauer et al. | 264/400 |
| 6,453,535 B1 * | 9/2002 | Nicholas | 29/413 |
| 6,713,718 B1 * | 3/2004 | Lu | 219/121.69 |
| 6,808,197 B2 * | 10/2004 | Bauer et al. | 280/728.3 |
| 6,811,735 B2 | 11/2004 | Ueno et al. | |
| 7,100,941 B2 * | 9/2006 | Riha et al. | 280/728.3 |
| 7,297,897 B2 * | 11/2007 | Nicholas et al. | 219/121.7 |

(Continued)

FOREIGN PATENT DOCUMENTS

DE    4115913 A1    11/1991

(Continued)

*Primary Examiner*—Toan C To
(74) *Attorney, Agent, or Firm*—Arent Fox LLP

(57) ABSTRACT

A front face distance is obtained by measuring the position of a front face of an instrument panel held by an end effecter of a robot. An error on an optical axis, at the position of the front face is obtained based on the front face distance. Based on the error, the position of the instrument panel is adjusted so that a focal point of a laser meets the position at a predetermined depth defined with the front face as the standard. A back face of the instrument panel is irradiated with a laser to form a fine hole of a fragile section.

5 Claims, 22 Drawing Sheets

U.S. PATENT DOCUMENTS

| | | | |
|---|---|---|---|
| 7,556,284 B2 * | 7/2009 | Riha et al. | 280/728.3 |
| 2002/0050046 A1 * | 5/2002 | Nicholas | 29/428 |

FOREIGN PATENT DOCUMENTS

| | | |
|---|---|---|
| DE | 19636429 C1 | 9/1996 |
| DE | 19850299 A1 | 5/2000 |
| DE | 10234198 A1 | 3/2003 |
| JP | 8-282420 A | 10/1996 |
| JP | 11-291069 A | 10/1999 |
| JP | 2001-239387 A | 9/2001 |
| JP | 2001-300748 A | 10/2001 |
| JP | 2002-144999 A | 5/2002 |
| JP | 2002-166809 A | 6/2002 |
| JP | 2004-155212 A | 6/2004 |
| JP | 2004-352103 A | 12/2004 |

* cited by examiner

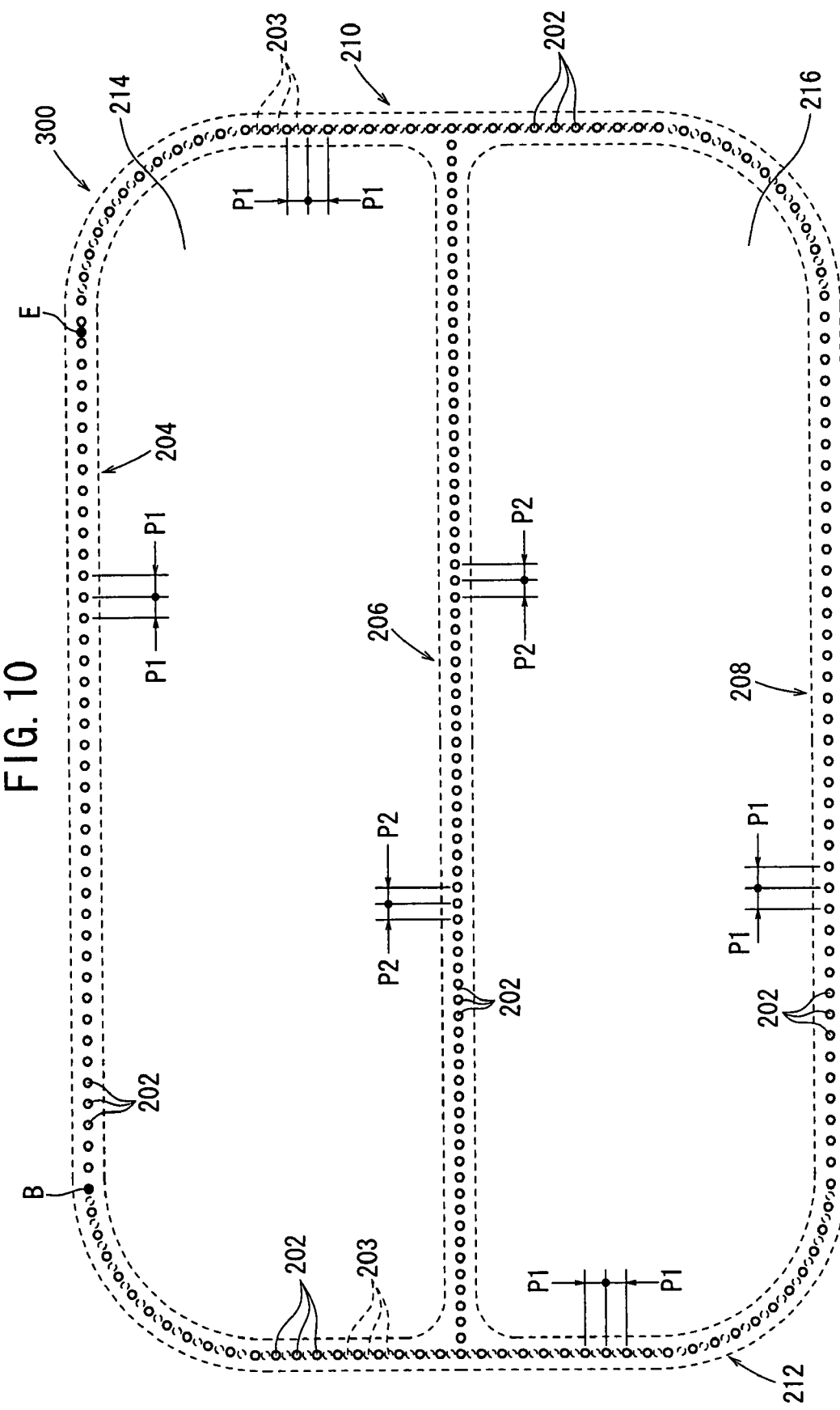

INTERIOR MATERIAL AND LASER BEAM PROCESSING METHOD FOR THE SAME

CROSS-REFERENCE TO RELATED APPLICATION

This application is a National Stage entry of International Application No. PCT/JP2006/304299, filed Mar. 6, 2006, the entire specification claims and drawings of which are incorporated herewith by reference.

TECHNICAL FIELD

The present invention relates to an interior member (interior material) including a fragile region, which can be ruptured when an air bag accommodated therein is expanded, and to a laser beam processing method for processing such an interior member.

BACKGROUND ART

In recent years, air bag systems have found wider use in vehicles such as automobiles. Such air bag systems include an air bag, which functions as an air bag for use with a shock absorbing device. The air bag is folded and housed inside a storage container. When a vehicle collision is detected by a sensor, the air bag is instantaneously inflated by a gas supplied from a gas generator, whereby the airbag functions as a cushion for absorbing shocks applied to the driver or passenger.

The air bag is covered with a resin-made interior member, such as a steering wheel cover or an instrument panel. When the air bag is inflated, a door panel of the resin-made interior member for deploying the air bag is forcibly opened and exposed outside of the storage container.

In order to open the door panel reliably, the door panel includes a fragile region, having a certain processed pattern such as grooves, holes, or the like formed therein.

It is known to form the fragile region by means of a processing method employing a heated blade or a laser beam. According to one proposed processing method that employs a laser beam, the position of the surface of the interior member is measured by a distance sensor, located at a given position, and grooves having a desired depth are formed by the laser beam while an output power of the laser beam is controlled based on the measured position. For details, reference should be made to Japanese Laid-Open Patent Publication No. 2001-300748 and Japanese Laid-Open Patent Publication No. 8-282420. In the processing method, a multi-axis robot is used as a moving mechanism.

Since the output power of the laser beam is controlled, the controller that is used is complex in structure, and the manufacturing costs therefor are high. For controlling the output power of the laser beam, it is necessary to directly operate an oscillating unit in a laser oscillator, which results in the apparatus being complex, and the control procedures for the apparatus are complicated. The grooves of the fragile region, which are formed in the thin instrument panel, need to be minute in size. However, it is practically difficult to only slightly change the output power of the laser beam, for appropriately shaping such minute grooves.

If the fragile region is constructed as an array of successive minute holes, in terms of quality of appearance, it is preferable to make the diameter of the minute holes on the surface sufficiently small and uniform, so as to be invisible.

The fragile region may be shaped as a single swing door panel, or as double swing door panels.

If the fragile region is shaped as double swing door panels, then it has been proposed to divide linear parts of the fragile region into outer edge corners, outer edge straight portions and a central boundary, as well as to change the rupture strengths thereof, for allowing the door panels to be smoothly released while preventing fragments from scattering around (see, for example, Japanese Laid-Open Patent Publication No. 2002-144999). According to this proposal, the rupture strength of the central boundary is equal to or greater than the rupture strength of the outer edges, so that the outer edges will be ruptured before the central boundary.

With the fragile region proposed in Japanese Laid-Open Patent Publication No. 2002-144999, different rupture strengths are achieved by changing the depth of grooves or the pitch of recesses, depending on a processing interval. However, it is difficult to obtain an appropriate rupture strength depending on the set location, simply by changing the depth of the grooves or the pitch of the recesses.

When a laser beam is applied to an interior member to form a fragile region therein, the interior member is held and moved by a robot, for example, at a constant speed and along a predetermined path with respect to the position where the laser beam is applied. By continuously applying the laser beam at an appropriate output level, the fragile region is produced in the form of a groove having a predetermined depth. By applying a pulsed laser beam, the fragile region is formed as perforations, in the shape of minute holes spaced at suitable intervals.

Immediately after the moving mechanism, such as a robot or the like, has started moving from a stopped state, the speed or the direction at which the moving mechanism moves may be somewhat unstable. If the laser beam is applied immediately after the moving mechanism has started moving, then the depth of the grooves or the pitch of the minute holes within the formed fragile region tends to become irregular, or the direction in which the fragile region extends is liable to become shifted from a predetermined direction.

DISCLOSURE OF THE INVENTION

It is an object of the present invention to provide a laser beam processing method for processing an interior member, in order to form an appropriate fragile region having a uniform shape within the interior member, employing a simple apparatus and procedure and maintaining a high level of quality in appearance.

Another object of the present invention is to provide an interior member, including a fragile region therein in the form of double swing door panels, the fragile region having linear parts that include processed zones each formed with an appropriate rupture strength, as well as a laser beam processing method for processing such an interior member.

Still another object of the present invention is to provide a laser beam processing method for processing an interior member in order to form a fragile region having a uniform shape therein when the interior member and a laser oscillator are moved relatively to each other by a moving mechanism, and when a laser beam is applied to the interior member to form the fragile region.

According to the present invention, there is provided a laser beam processing method for processing an interior member for covering an air bag accommodated inside the interior member, to form a fragile region which is ruptured when the air bag is expanded, comprising a first step of measuring the position of a first surface of the interior member, which serves as a facing side when the interior member is installed in a vehicle, a second step of adjusting the position of a focal point of the laser beam so as to be aligned with the position at a predetermined depth from the first surface based on a measured result from the first step, and a third step of applying the laser beam to a second surface of the interior member, which serves as a reverse side when the interior member is installed in the vehicle, thereby forming at least a portion of the fragile region.

The position of the focal point is thus adjusted to form an appropriate fragile region having a uniform shape in the interior member, employing a simple apparatus and procedure and without the need for adjusting a laser energy source, a laser oscillator, etc. The fragile region has a uniform shape based on the first surface, and is sufficiently fragile so that the interior member will not be ruptured while the vehicle is running normally, but will reliably be ruptured when the air bag is expanded.

If minute holes extend through the interior member, then the focal point of the laser beam is positioned at a certain depth from the first surface while the interior member is being processed. The openings of the minute holes on the first surface have a minute and uniform diameter, thereby achieving a high level of quality in appearance.

The instrument panel actually has slight variations in thickness. However, since the surface distance from the first surface is measured, the focal point can be set at a predetermined depth from the first surface regardless of such thickness variations.

In the second step, the position of the interior member or the position of a laser oscillator for emitting the laser beam is moved in order to change the relative distance between the interior member and the laser oscillator and thereby adjust the focal point of the laser beam.

In the second step, the optical system of the laser oscillator for emitting the laser beam may also be moved in order to adjust the focal point of the laser beam.

In the laser beam processing method for processing the interior member according to the present invention, the position of the focal point is adjusted so as to form an appropriate fragile region having a uniform shape in the interior member, employing a simple apparatus and procedure and without the need for adjusting a laser energy source, a laser oscillator, etc. The fragile region has a uniform shape based-on the first surface, and is sufficiently fragile so that the interior member will not be ruptured while the vehicle is running normally, but will reliably be ruptured when the air bag is expanded.

The first surface forms a surface that is visually recognized by passengers of the vehicle. The fragile region maintains a high level of quality in appearance since it is based on the first surface. Specifically, if minute holes extend through the interior member, then the focal point of the laser beam is positioned at a certain depth from the first surface while the interior member is being processed. The openings of the minute holes on the first surface have only a minute uniform diameter, thereby achieving a high level of quality in appearance.

According to the present invention, there is also provided an interior member including a fragile region, which is ruptured when an air bag accommodated therein is expanded, the fragile region being constructed of a series of plural minute recesses. The fragile region comprises substantially parallel first opposite sides, substantially parallel second opposite sides that interconnect both ends of the first opposite sides, thereby forming a rectangular shape, and a central line disposed at an intermediate location between the first opposite sides and having both ends connected to the second opposite sides. Main recesses provided on the first opposite sides and the second opposite sides are spaced at a given pitch, main recesses on the central line are spaced at a pitch smaller than the given pitch of the main recesses on the first opposite sides and the second opposite sides. Auxiliary recesses, which are shallower than the main recesses, are provided between the main recesses on the second opposite sides.

By thus changing the pitch and/or the depth of the main recesses, an appropriate rupture strength is achieved in each of the linear processing zones. For example, the central line and the second opposite sides are set at the same tensile strength. Consequently, when the air bag is expanded, the fragile region is reliably ruptured or bent, so that the fragile region opens as double swing panel doors in a predetermined sequence. Since the second opposite sides are of a larger pitch and do not have auxiliary recesses therein, they are less fragile and will reliably be bent.

According to the present invention, there is also provided a laser beam processing method for processing an interior member including a fragile region, which is ruptured when an air bag accommodated therein is expanded, wherein the fragile region is constructed of a series of plural minute recesses. The fragile region comprises substantially parallel first opposite sides, substantially parallel second opposite sides that interconnect both ends of the first opposite sides, thereby forming a rectangular shape, and a central line disposed at an intermediate location between the first opposite sides and having both ends connected to the second opposite sides. The laser beam processing method comprises the steps of applying the laser beam in pulses having a first cyclic period and a first pulse duration to form the first opposite sides, applying the laser beam in pulses having a second cyclic period shorter than the first cyclic period and the first pulse duration to form the central line, and applying the laser beam in alternate pulses having the first pulse duration and a second pulse duration shorter than the first pulse duration to form the second opposite sides.

In this manner, pulses having the first pulse duration and pulses having the second pulse duration are alternately applied, in order to form deep main recesses and shallow auxiliary recesses in the second opposite sides for thereby achieving an appropriate rupture strength, so that the second opposite sides are set at the same tensile strength, for example. On the first opposite sides, pulses are applied at the first cyclic period, which is a relatively long cyclic period, increasing the pitch. The first opposite sides are thus less fragile and will reliably be bent when the air bag is expanded.

With the interior member according to the present invention, by changing the pitch and/or the depth of the main recesses, an appropriate rupture strength is achieved in each of the linear processing zones. When the air bag is expanded, the fragile region is reliably ruptured or bent, thereby opening as double swing panel doors in a predetermined sequence. Since the second opposite sides have a larger pitch and are free of auxiliary recesses, they are less fragile and will reliably be bent.

With the laser beam processing method for processing the interior member according to the present invention, pulses having the first pulse duration and pulses having the second pulse duration are alternately applied, in order to form deep main recesses and shallow auxiliary recesses in the second opposite sides, for thereby achieving an appropriate rupture strength. On the first opposite sides, pulses are applied in the first cyclic period, which is a relatively long cyclic period, for increasing the pitch. The first opposite sides are thus less fragile, and will reliably be bent when the air bag is expanded.

According to the present invention, there is further provided a laser beam processing method for processing an interior member for covering an air bag accommodated therein with a laser beam emitted from a laser oscillator, to thereby form a fragile region that is ruptured when the accommodated air bag is expanded, the laser beam processing method employing a programmable moving mechanism for relatively moving the interior member and the laser oscillator. The laser beam processing method comprises the steps of positioning the focal point of the laser beam at an operation preparing point which is spaced, in a direction opposite to the direction in which the interior member is processed, from an initial processing start point at which at least a portion of the fragile region is formed, bringing the focal point toward the processing start point to stabilize a moving speed thereof, and emitting the laser beam from the laser oscillator to start processing the fragile region after the focal point has reached the processing start point.

As described above, before the laser beam is applied, the focal point is placed at the operation preparing point which is spaced, in a direction opposite to the direction in which the interior member is processed, from the initial processing start point. Thereafter, the focal point is brought toward the processing start point to stabilize the moving speed thereof and for thereby providing a run-up interval required to accelerate the moving mechanism. When the processing start point reaches the focal point, both the operating speed and the relative moving speed of the moving mechanism are stabilized. Therefore, when the laser beam is emitted from the laser oscillator, a fragile region having a uniform shape is produced.

With the laser beam processing method for processing the interior member according to the present invention, when the laser beam is applied to form the fragile region, while the interior member and the laser oscillator are moved relatively by the moving mechanism, the moving mechanism is operated to bring the focal point toward the processing start point, for thereby stabilizing the operating speed and the relative moving speed of the moving mechanism. Therefore, a fragile region having a uniform shape is produced when the laser beam is subsequently applied.

BRIEF DESCRIPTION OF THE DRAWINGS

FIG. 10 is a view of a fragile region formed by a laser beam processing method according to a second embodiment.

BEST MODE FOR CARRYING OUT THE INVENTION

Interior members and laser beam processing methods therefor according to first through third embodiments of the present invention shall be described below with reference to FIGS. 1 through 22 of the accompanying drawings. The laser beam processing methods for the interior members according to the first through third embodiments form a fragile region 200 (see FIG. 5), which is ruptured when an air bag is expanded. The fragile region 200 is formed with a laser beam in an instrument panel (interior member) 12, which comprises a thin resin plate covering an air bag that is accommodated in any of a dashboard, a steering wheel central portion, a door, or the like, of a motor vehicle. The laser processing system 10, as shown in FIG. 1, is employed to carry out the laser beam processing methods.

First, the laser beam processing method according to the first embodiment shall be described below with reference to FIGS. 1 through 9. According to the laser beam processing method, the position of a focal point is adjusted to form an appropriate fragile region having a uniform shape in an interior member, employing a simple apparatus and procedure without the need for adjusting a laser energy source, a laser oscillator, etc.

Figure 1:
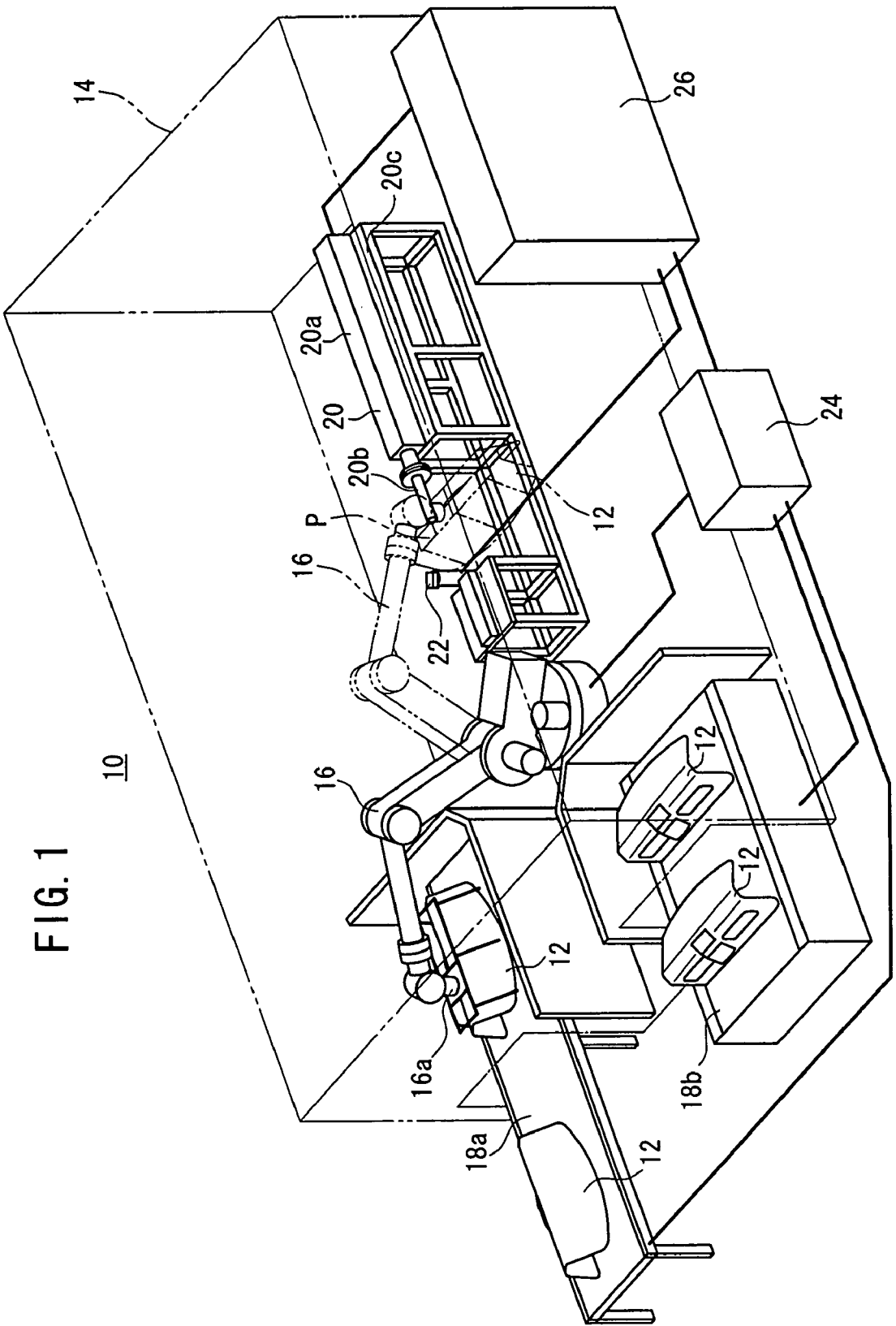
FIG. 1 is a perspective view of a laser processing system.

As shown in FIG. 1, the laser processing system 10 is installed in a processing booth 14, surrounded by walls on four sides thereof. The laser processing system 10 comprises an articulated robot 16 for holding an instrument panel 12 with an end effector 16a, and for placing the instrument panel 12 in a processing position P, a loading line 18a for supplying instrument panels 12 to the processing booth 14, an unloading line 18b for unloading instrument panels 12 from the processing booth 14, a laser oscillator 20 for applying a laser beam to an instrument panel 12 placed in the processing position P, a non-contact distance sensor 22 disposed across the processing position P from the laser oscillator 20 for detecting the position of a surface (first surface) 12a of the instrument panel 12, and a laser controller 26 for controlling the laser oscillator 20. The loading line 18a has a jig for accurately holding the instrument panel 12, so that the robot 16 can hold the loaded instrument panel 12 accurately at a predetermined location.

The instrument panel 12 comprises a thin resin-molded product for use on the dashboard of a vehicle, for example. A facing side 12a of the instrument panel 12 comprises a surface that is viewed by a passenger when the instrument panel 12 is installed in the vehicle. The instrument panel 12 also has an opposite reverse surface (second surface) 12b, which faces toward the accommodated air bag. The instrument panel 12 comprises a base layer 28 (see FIG. 1) and a skin layer 30, which is thinner than the base layer 28. The base layer 28 is made of polypropylene and the skin layer 30 is made of thermoplastic olefin (TPO), for example. The base layer 28 may further comprise a plurality of layers insofar as the layers collectively function as a base. The robot 16 comprises a 6-axis programmable industrial robot. The robot 16 is disposed such that when the robot 16 moves an instrument panel 12 held thereby to the processing position P, the facing side 12a of the instrument panel 12 faces the non-contact distance sensor 22, whereas the reverse side 12b faces the laser oscillator 20.

The laser oscillator 20 includes a main body 20a having a prismatic shape and a narrow tubular irradiator head 20b mounted on the distal end of the main body 20a. The laser oscillator 20 is horizontally installed on a support base 20c. A laser beam generated by the main body 20a travels to the irradiator head 20b, where it is focused by a lens (optical system) 20d on the distal end of the irradiator head 20b onto a focal point f having a focal distance F (see FIG. 2). The laser oscillator 20 may be arranged such that the laser beam is applied after it has been refracted and reflected by a plurality of lenses and mirrors (optical system).

The laser oscillator 20 may comprise a $CO_2$, excimer, semiconductor, argon gas, or diode laser oscillator, for example.

Figure 2:
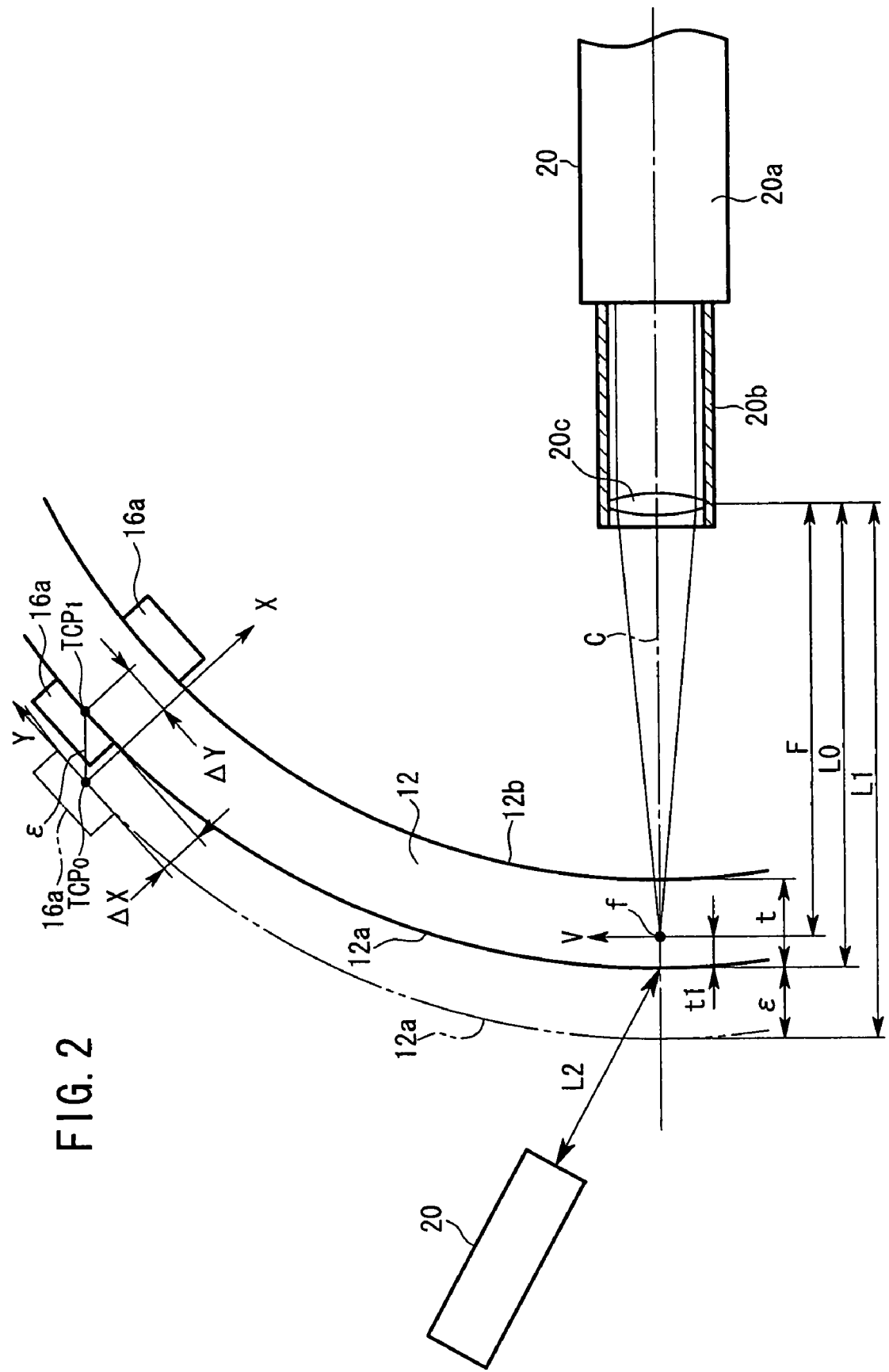
FIG. 2 is a schematic plan view showing a non-contact distance sensor, a laser oscillator, and an instrument panel disposed in a processing position.

As shown in FIG. 2, the laser beam emitted from the laser oscillator 20 travels along an optical axis C and converges at the position of the focal point f. Basically, the focal point f is located within the thickness t of the instrument panel 12, and is set at a position having a depth t1 from the facing side 12a. The reverse side 12b of the instrument panel 12 lies substantially perpendicular to the optical axis C.

The non-contact distance sensor 22, which comprises a laser (e.g., semiconductor) sensor, measures a surface distance L2 to a nearby point on the facing side 12a of the instrument panel 12 on the optical axis C, and supplies the measured surface distance L2 to the laser controller 26. The position on the facing side 12a of the instrument panel 12 measured by the non-contact distance sensor 22 need not necessarily be a point on the optical axis C, insofar as the position lies within a range wherein an error ϵ can be identified. The direction in which the surface distance L2 is measured (the direction represented by the surface distance L2) may also be non-parallel to the optical axis C.

The laser controller 26 is capable of recognizing in real time the position on the facing side 12a of the instrument panel 12 based on the surface distance L2. The laser beam applied from the non-contact distance sensor 22 to the facing side 12a is a laser beam having a weak energy used for measurement only, and is incapable of processing or deforming the instrument panel 12, unlike the laser emitted by the laser oscillator 20.

Figure 3:
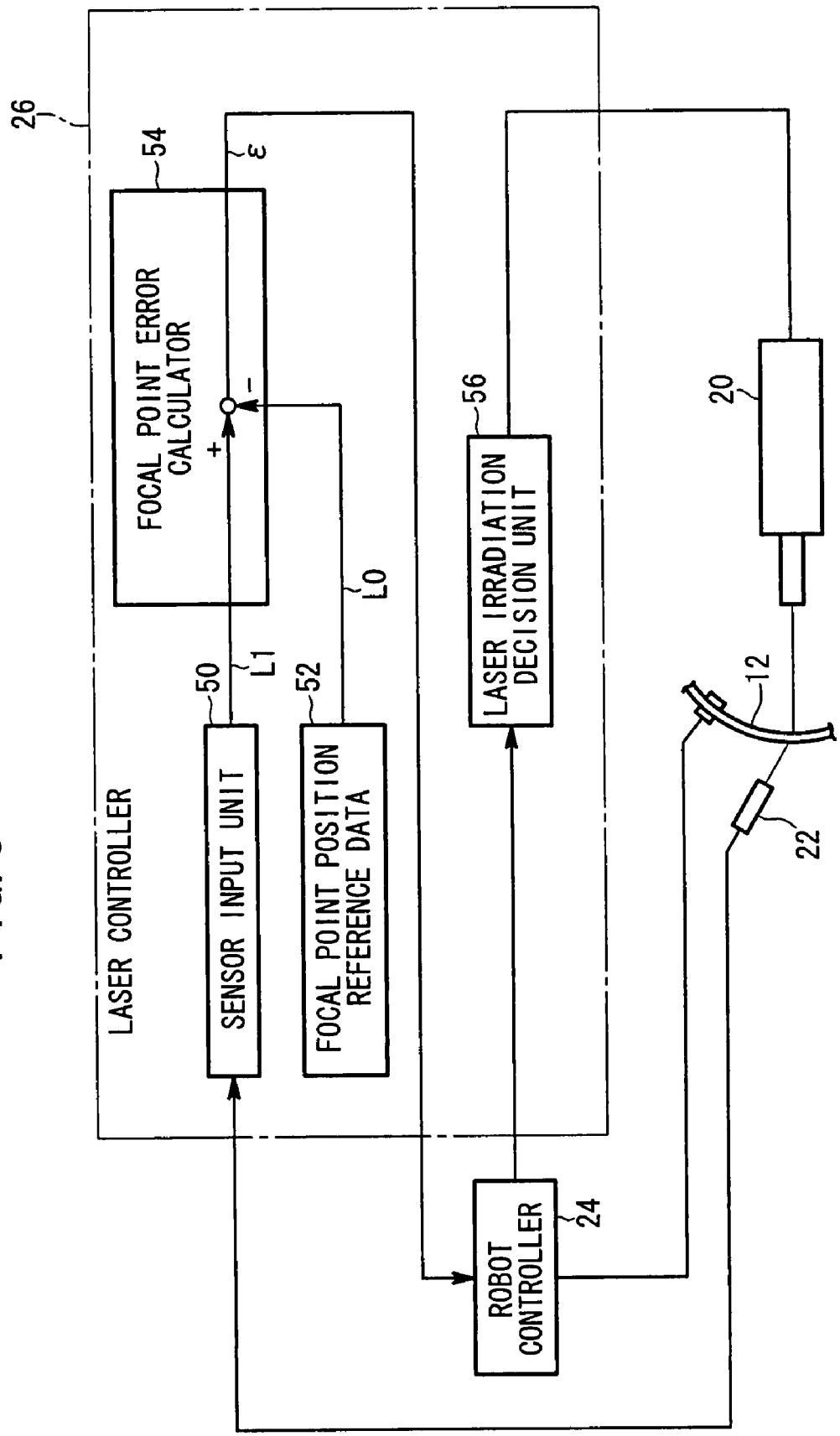
FIG. 3 is a block diagram of a laser controller.

As shown in FIG. 3, the laser controller 26 comprises a sensor input unit 50 for reading a measured result from the non-contact distance sensor 22, and a focal point error calculator 54 for calculating an error ϵ of the focal point position, based on focal point position reference data 52 indicative of a reference distance L0 (see FIG. 2) where the instrument panel 12 is to be disposed and the measured result sent from the non-contact distance sensor 22 through the sensor input unit 50. The laser controller 26 supplies the calculated error E to a robot controller 24.

The laser controller 26 also has a laser irradiation decision unit 56 for determining when to start and stop applying the laser beam based on instructive information from the robot controller 24, and for starting or stopping application of the laser beam from the laser oscillator 20. The laser irradiation decision unit 56 also determines times and intervals for application of the laser beam, and instructs a laser irradiator to apply the laser beam as pulses, for example.

Figure 4:
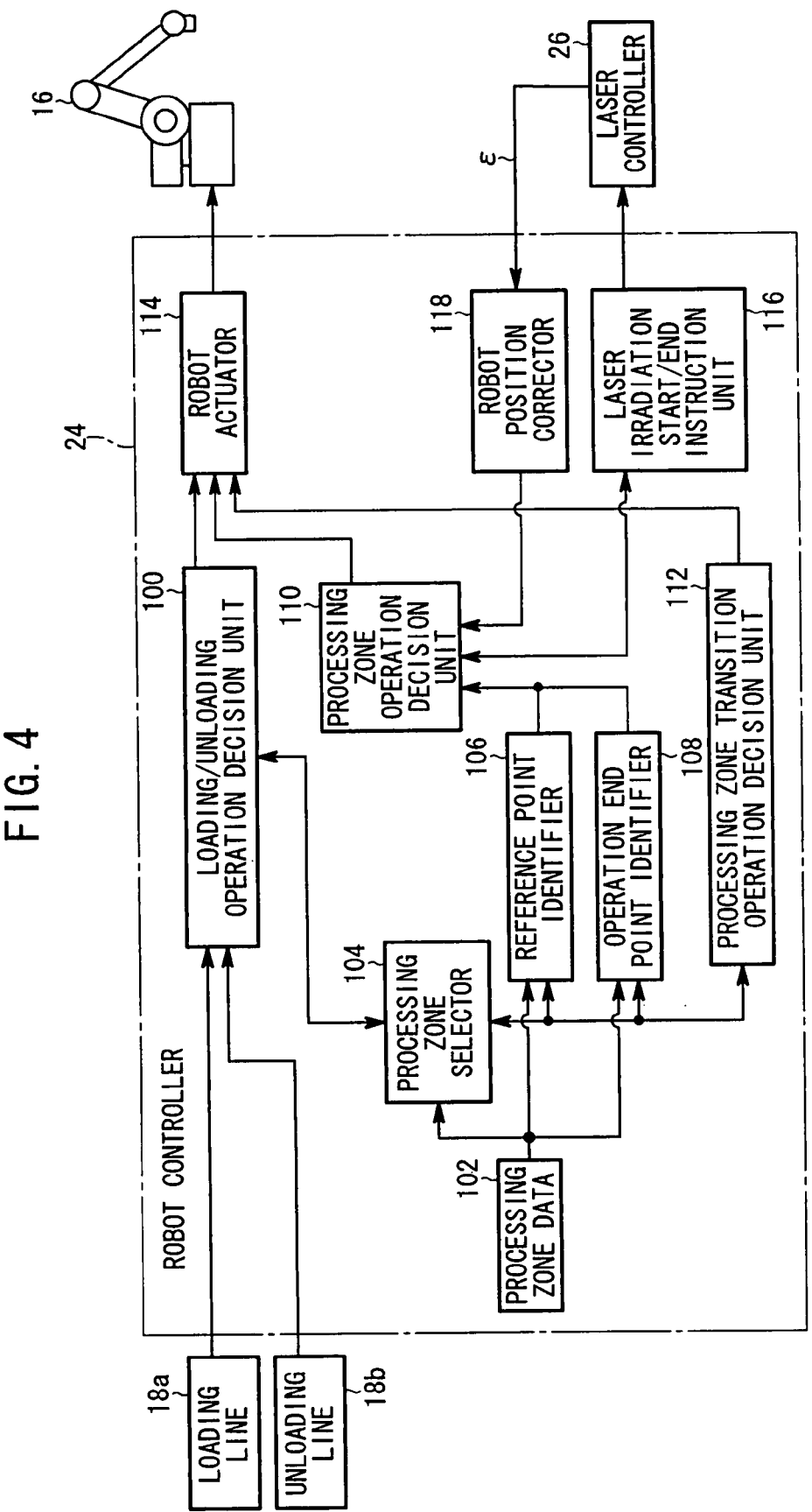
FIG. 4 is a block diagram of a robot controller.

As shown in FIG. 4, the robot controller 24 comprises a loading/unloading operation decision unit 100 for determining an operation to load and unload an instrument panel 12 while exchanging information with the loading line 18a and the unloading line 18b, a processing zone selector 104 for successively selecting zones to be processed from processing zone data 102 representing information such as a route configuration within each processing zone in a fragile region 200, a reference point identifier 106 for identifying a processing start point Bn as an initial point of the route for each processing zone data 102 and an operation preparing point Qn, and an operation end point identifier 108 for identifying a processing end point En as a final point of the route. The suffix n for each of the processing start point Bn, the processing end point En, and the operation preparing point Qn represents an identifier, indicative of a processing turn among a plurality of processing zone data 102, and is identified by n=1, 2, 3, 4, 5. An upper line 204, a lower line 208, a right line 210, a left line 212, and a central line 206 are successively processed in order, wherein the identifier suffix n corresponds in order to such indicated lines (see FIG. 5).

The robot controller 24 further includes a processing zone operation decision unit 110 for operating the robot 16 while using the processing start point Bn and the processing end point En respectively as operating start and end points within a processing zone selected by the processing zone selector 104, a processing zone transition operation decision unit 112 for moving the robot 16 to bring the focal point f into alignment with the processing start point Bn of a next processing zone after processing of a given processing zone has finished, and a robot actuator 114 for actuating the robot 16 based on determined results of the operation decision units 100, 110, 112.

In the laser beam processing methods according to the first and second embodiments, the processing start point Bn and the processing end point En are regarded as a processing start point B and a processing end point E, respectively, for illustrative purposes, and the operation preparing point Qn will not be described. The processing start point Bn, the processing end point En, and the operation preparing point Qn are used in the description of the laser beam processing method according to the third embodiment.

The robot controller 24 has a laser irradiation start/end instruction unit 116 for determining when to start and stop application of the laser beam based on the present position of the robot 16 in cooperation with the processing zone operation decision unit 110, and for instructing the laser controller 26 accordingly, and a robot position corrector 118 for recognizing a present attitude of the robot 16 and correcting the attitude of the robot 16 based on the error ϵ obtained from the laser controller 26.

The corrected attitude determined by the robot position corrector 118 is supplied through the processing zone operation decision unit 110 to the robot actuator 114, which controls the robot 16 so as to assume the corrected attitude.

Each of the laser controller 26 and the robot controller 24 comprises a CPU (Central Processing Unit) as a main control unit, a RAM (Random Access Memory) and a ROM (Read Only Memory) as storage units, and drivers, etc. The above functional components are implemented when the CPU reads a program and performs software processing while interacting with the storage units. The functions of the laser controller 26 and the robot controller 24 may be different from those described above, and the laser controller 26 and the robot controller 24 may be disposed integrally with each other.

The fragile region 200 formed in the instrument panel 12 by the laser processing system 10 shall be described below.

Figure 5:
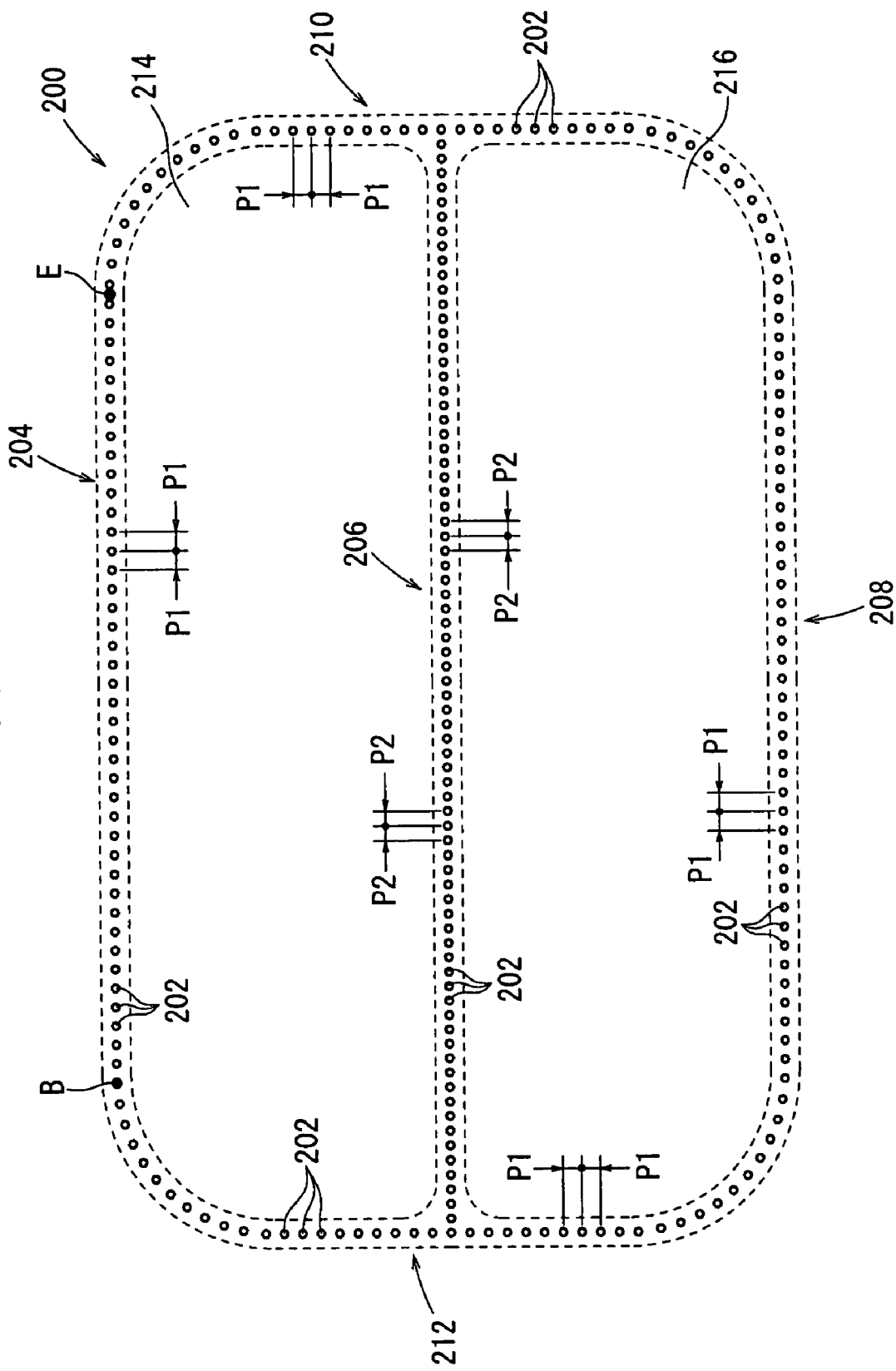
FIG. 5 is a view of a fragile region.

As shown in FIG. 5, the fragile region 200 comprises a plurality of minute holes (main recesses) 202 arranged as an array of perforations. The laser processing system 10 bores the minute holes 202 with the laser beam to thereby form the fragile region 200. The fragile region 200 has an upper line 204, a central line 206, and a lower line 208, which are horizontally elongate and parallel to each other, and a right line 210 and a left line 212, which extend vertically at left and right ends. The right line 210 and the left line 212 have upper and lower ends in a smooth arcuate shape that are connected to the upper line 204 and the lower line 208.

In the laser processing system 10, the upper line 204, the central line 206, the lower line 208, the right line 210, and the left line 212 are established as individual processing zones, wherein processing zone data therefor are stored in the robot controller 24. For example, the upper line 204 begins being processed from the left processing start point B, while processing of the upper line 204 stops at the right processing end point E in FIG. 5.

The pitch of the minute holes 202 within the fragile region 200, as well as the irradiation time of the laser beam, differs depending on the processing zone. Specifically, on the central line 206, the minute holes 202 are provided at intervals represented by a short pitch P2, so that the central line 206 becomes the most fragile (having the lowest strength) and develops an initial crack when the air bag is expanded.

Specifically, the air bag is accommodated near the fragile region 200 behind the reverse side 12b of the instrument panel 12. When the air bag is expanded, the air bag pushes the reverse side 12b of the instrument panel 12, and initially engages the central area of the fragile region 200 in order to rupture the central line 206. Thereafter, as the air bag is further expanded, the minute holes 202 join with each other to spread the crack until the crack reaches the right line 210 and the left line 212.

On the right line 210 and the left line 212, the minute holes 202 are provided at intervals represented by a pitch P1, which is longer than the pitch P2, with short pitch holes (not shown) being provided at an intermediate position between the minute holes 202. The short pitch holes are blind holes produced by shortening the laser irradiation time. Since the right line 210 and the left line 212 have short pitch holes, they are relatively highly fragile, allowing the crack produced on the central line 206 to travel continuously upwardly and downwardly.

On the upper line 204 and the lower line 208, minute holes 202 are provided at intervals represented by the same pitch P1 as on the right line 210 and the left line 212, however, short pitch holes are not provided. The upper line 204 and the lower line 208 are appropriately formed with a relatively small fragility. Therefore, the crack traveling along the right line 210 and the left line 212 stops at the junctions thereof with the upper line 204 and the lower line 208, while causing the upper line 204 and the lower line 208 to bend due to their appropriate fragility. In this manner, an upper area 214 positioned between the upper line 204 and the central line 206 opens upwardly, whereas a lower area 216 positioned between the lower line 208 and the central line 206 opens downwardly. The air bag inflates into the passenger compartment and functions as a passenger cushion. Since the upper line 204 and the lower line 208 are bent but not ruptured, the upper area 214 and the lower area 216 are not separated and scattered outwardly from the instrument panel 12.

In FIG. 5, the minute holes 202 are shown to be relatively large in diameter. Actually, the minute holes 202 are of a diameter that is sufficiently small so as to be invisible (e.g., 100 μm or less). The broken lines shown in FIG. 5 are imaginary lines, which have been added so that the viewer can recognize the fragile region 200 more easily.

Figure 6:
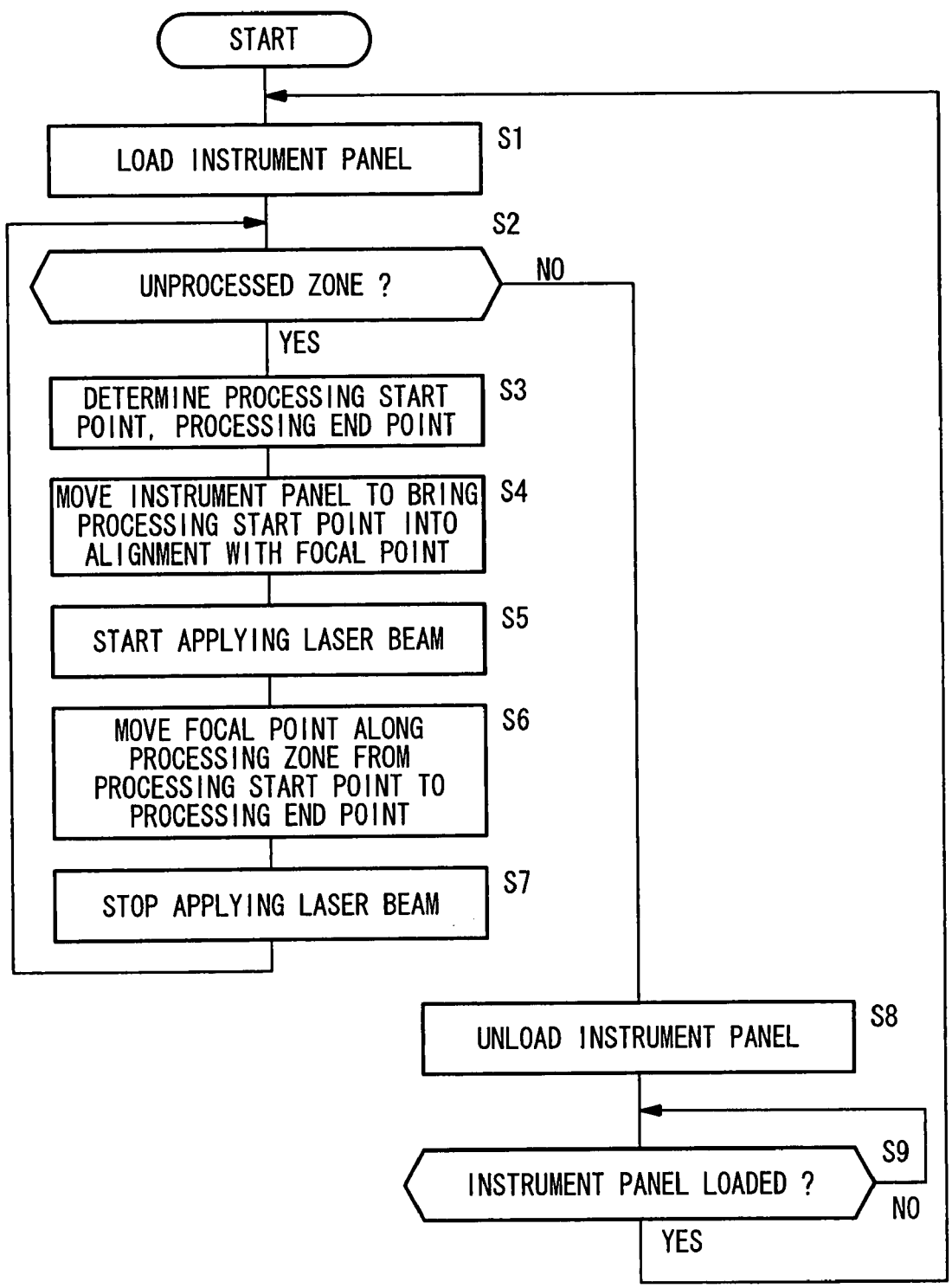
FIG. 6 is a flowchart of the sequence of a laser beam processing method according to a first embodiment.

The laser beam processing method according to the first embodiment, for forming a fragile region 200 in the instrument panel 12 with the laser processing system 10, shall be described below with reference to FIG. 6. In the following description, the process is carried out in the same order as the illustrated step numbers unless otherwise noted. In the laser processing system 10, the focal point f is fixed, and the instrument panel 12 is moved by the robot 16. To facilitate understanding in comparison with the drawings, however, in the following description, the focal point f shall be described as moving with respect to the instrument panel 12. Actually, the laser processing system 10 may be arranged such that the focal point f and the instrument panel 12 move relatively to each other.

In step S1, the robot 16 is operated by the loading/unloading operation decision unit 100 to move toward an instrument panel 12, which has been loaded by the loading line 18a and held by the end effector 16a, at the processing position P. At this time, the robot 16 moves the instrument panel 12 while the instrument panel 12 is oriented with the reverse side 12b thereof facing the laser oscillator 20.

In step S2, the processing zone selector 104 confirms whether the fragile region 200 includes an unprocessed zone or not. If the fragile region 200 includes an unprocessed zone, then the zone to be processed next is identified, and control proceeds to step S3. If it is determined that all zones of the fragile region 200 have already been processed, then control proceeds to step S8.

In step S3, the reference point identifier 106 and the operation end point identifier 108 identify a processing start point B and a processing end point E, respectively, thereby defining the zone to be processed next.

In step S4, the processing zone transition operation decision unit 112 defines the movement of the robot 16, and moves the instrument panel 12 so that the focal point f is aligned with the processing start point B.

In step S5, the processing zone operation decision unit 110 controls the laser irradiation start/end instruction unit 116 so as to instruct the laser controller 26 to enable the laser oscillator 20 to start applying the laser beam to the instrument panel 12. As described above, the laser beam is applied in pulses to the instrument panel 12.

In step S6, the processing zone operation decision unit 110 defines the movement of the robot 16 in order to move the instrument panel 12 at a predetermined moving speed V, thereby relatively moving the focal point f along the processing zone from the processing start point B to the processing end point E.

In step S7, when the focal point f reaches the processing end point E, the processing zone operation decision unit 110 controls the laser irradiation start/end instruction unit 116 so as to instruct the laser controller 26 to cause the laser oscillator 20 to stop applying the laser beam to the instrument panel 12. Thereafter, control returns to step S2. If there are any unprocessed zones remaining, then processing thereof is continued in succession.

In step S8 (after all zones of the fragile region 200 have been processed), the loading/unloading operation decision unit 100 operates the robot 16 to place the processed instrument panel 12 on the unloading line 18b, which unloads the instrument panel 12 and transports the instrument panel 12 to the next process.

Thereafter, in step S9, control waits until an unprocessed instrument panel 12 is loaded from the loading line 18a. Control returns to step S1 once loading of the unprocessed instrument panel 12 has been confirmed.

The sequence for processing the instrument panel in step S6 shall be described below with reference to FIG. 7. The process shown in FIG. 7 is continuously carried out, at each very small time period, by the robot controller 24 and the laser controller 26.

Figure 7:
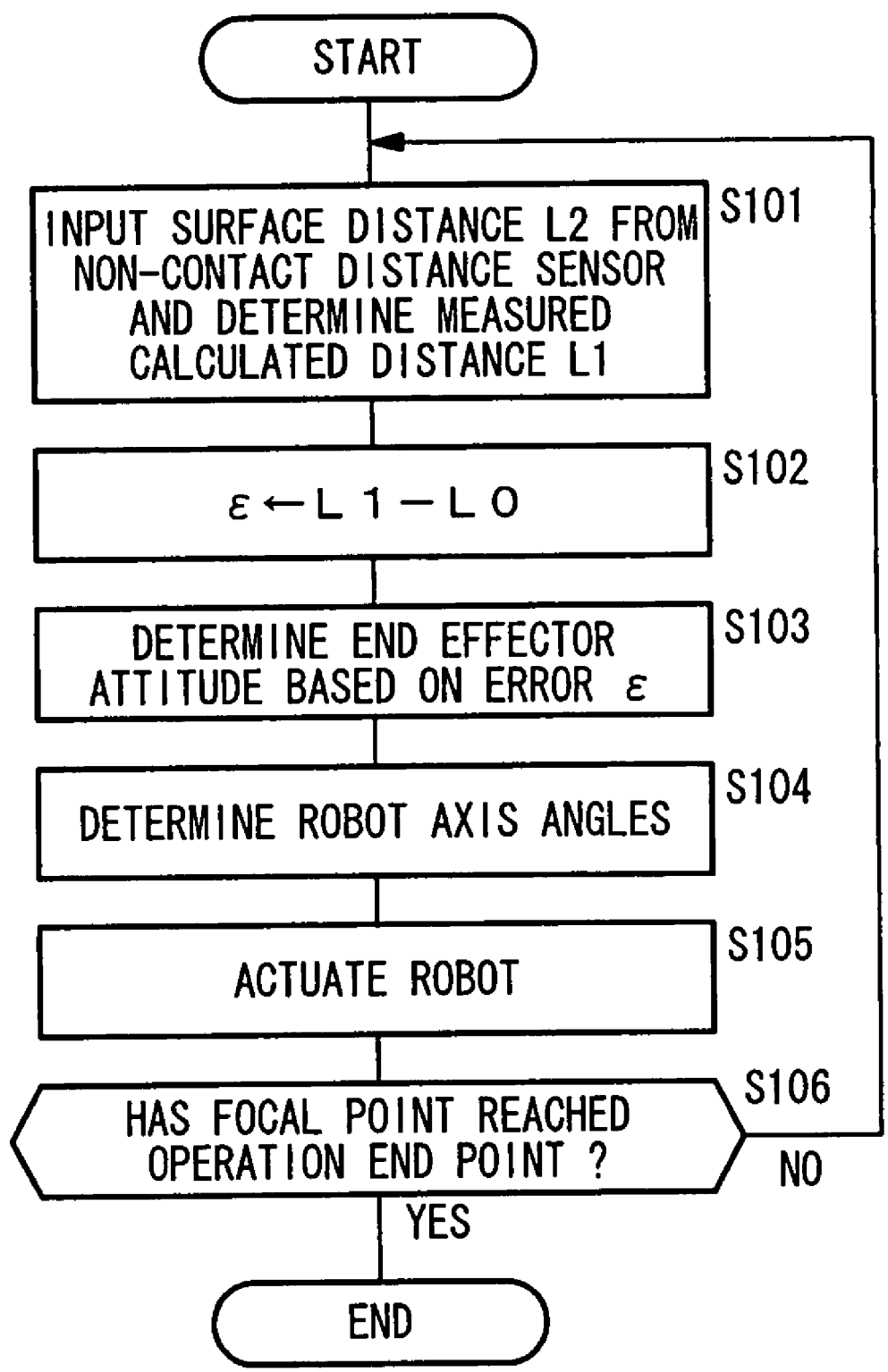
FIG. 7 is a flowchart of a sequence for determining the attitude of a robot, when a focal point is moved from a reference point to a shutdown position.
Figure 8:
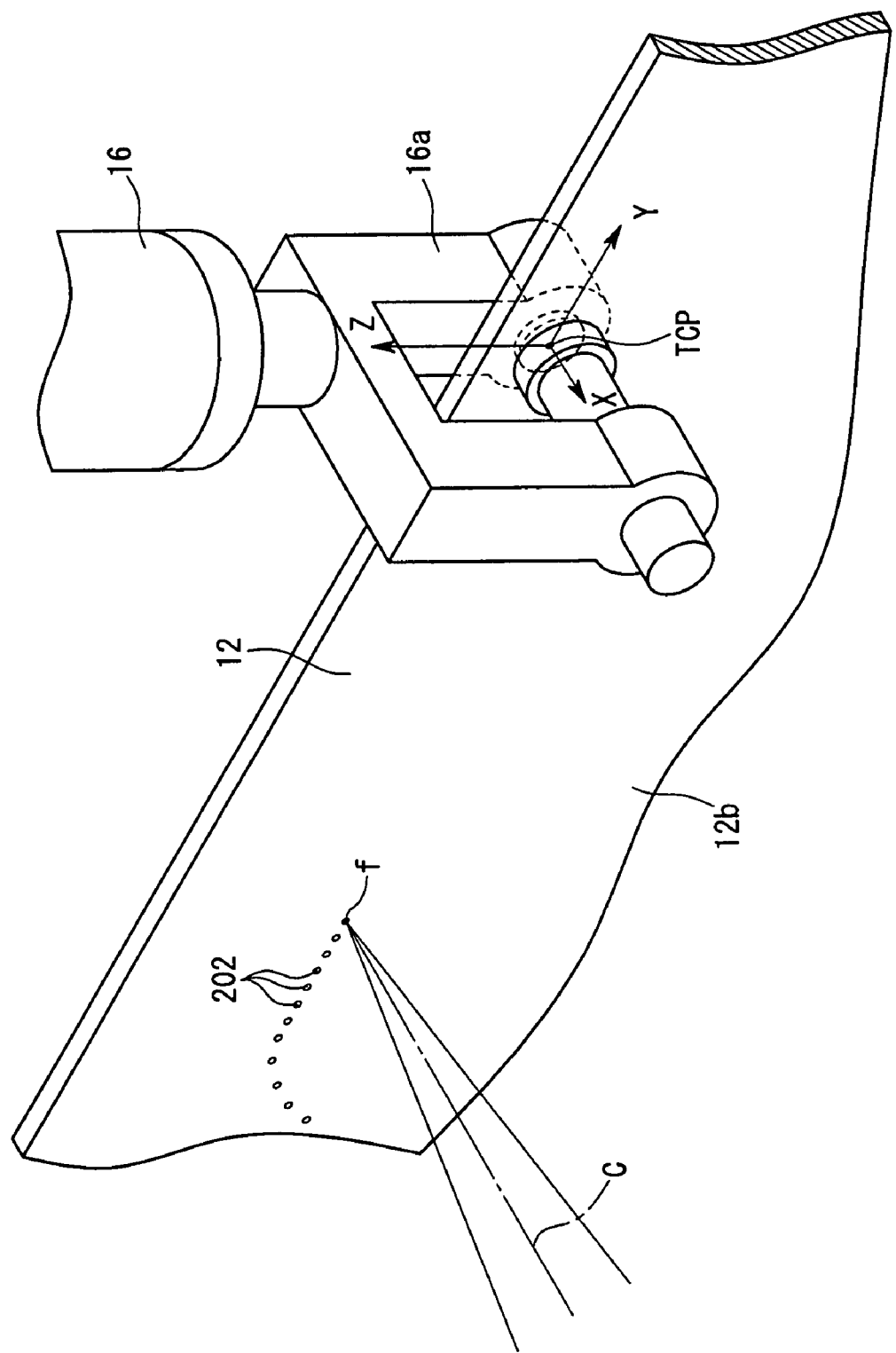
FIG. 8 is a perspective view showing an instrument panel held by an end effector.

In step S101 shown in FIG. 7, the laser controller 26 is supplied with the surface distance L2 measured by the non-contact distance sensor 22 through the sensor input unit 50, and then determines a measured calculated distance L1 from the laser oscillator 20 to the facing side 12a of the instrument panel 12, based on the surface distance L2, the positional data of the non-contact distance sensor 22, and data of a tilt angle thereof with respect to the optical axis C.

In step S102, the focal point error calculator 54 calculates an error ϵ by subtracting the reference distance L0 from the measured calculated distance L1, and supplies the error ϵ to the robot controller 24.

In step S103, the robot position corrector 118 of the robot controller 24 determines an attitude of the end effector 16a to be moved based on the error ϵ. Specifically, as shown in FIG. 2, the robot position corrector 118 determines a traveled position of the end effector 16a, for moving the instrument panel 12 toward the optical axis C by the error ϵ. The traveled distance is represented by a TCP (Tool Center Point, see FIG. 8) having tool coordinates based on the position and attitude of the end effector 16a. For moving the instrument panel 12 toward the optical axis C by the error ϵ, if the movement represents a translation within a plane defined by the X coordinate in a direction normal to the facing side 12a and the Y coordinate in a direction parallel to the facing side 12a, of the orthogonal X, Y, Z coordinates as tool coordinates, then such movement is indicated as a traveled distance ΔX with respect to the X coordinate and a traveled distance ΔY with respect to the Y coordinate. If a source position from which the instrument panel 12 is to move is indicated as $TCP_0$, then a destination position $TCP_1$ to which the instrument panel 12 is to move is determined by adding the traveled distances ΔX and ΔY to $TCP_0$. The traveled distances ΔX and ΔY are determined based on an angle formed between the X coordinate and the optical axis C.

For illustrative purposes, the traveled distances ΔX and ΔY are shown in FIG. 2 in a static state, in which the processing point on the instrument panel 12 is not moving. Actually, however, in view of the moving speed V at which the focal point f on the instrument panel 12 moves relatively, the destination position $TCP_1$ may be determined as a position produced by adding the error ϵ and the moving speed V as vectors. The destination position $TCP_1$ may also change with respect to the source position $TCP_0$ in the Z-coordinate direction, and movement of the instrument panel 12 need not be limited to translational movement, but may also be represented by rotational movement. In such cases, the destination position $TCP_1$ may be determined taking into account a traveled distance ΔZ in the Z-coordinate direction, as well as an attitude change due to rotation.

The process for determining the destination position $TCP_1$ is not limited to the above process. The destination position $TCP_1$ may be determined by any of various processes, based on the axis arrangement of the robot 16, etc.

In step S104, the robot position corrector 118 performs known inverse transform matrix calculations and/or predetermined convergence calculations based on the destination position $TCP_1$, so as to determine each axis angle of the robot 16.

In step S105, the processing zone operation decision unit 110 actuates the robot 16 based on the corrected attitude data supplied from the robot position corrector 118, while taking into account the moving speed V.

In step S106, it is confirmed whether or not the focal point f has reached the processing end point E. If the focal point f has reached the processing end point E, then the process shown in FIG. 6 is terminated. If the focal point f has not yet reached the processing end point E, then control returns to step S101, and the process is continued.

With the laser beam processing method according to the first embodiment, as described above, the robot 16 is used to move the instrument panel 12, based on the surface distance L2 measured by the non-contact distance sensor 22, thereby changing the relative distance between the instrument panel 12 and the laser oscillator 20. The position of the focal point f of the laser beam is thus adjusted in alignment with the position at a depth t1 from the facing side 12a. Accordingly, without requiring adjustment of the energy source, the oscillator, etc., inside the main body 20a of the laser oscillator 20, it is still possible to form a fragile region having an appropriate shape in an interior member by means of a simple apparatus and procedure. In addition, the laser oscillator 20 can be of a general-purpose nature.

The minute holes 202 of the fragile region 200 have a uniform shape based on the facing side 12a, and are appropriately fragile so that they will not be ruptured while the vehicle is running normally, but can reliably be ruptured when the air bag is expanded. Since the facing side 12a is a surface that is visually recognized by passengers of the vehicle, the fragile region 200 retains a high level of quality in appearance, since it is based on the facing side 12a.

Figure 9A:
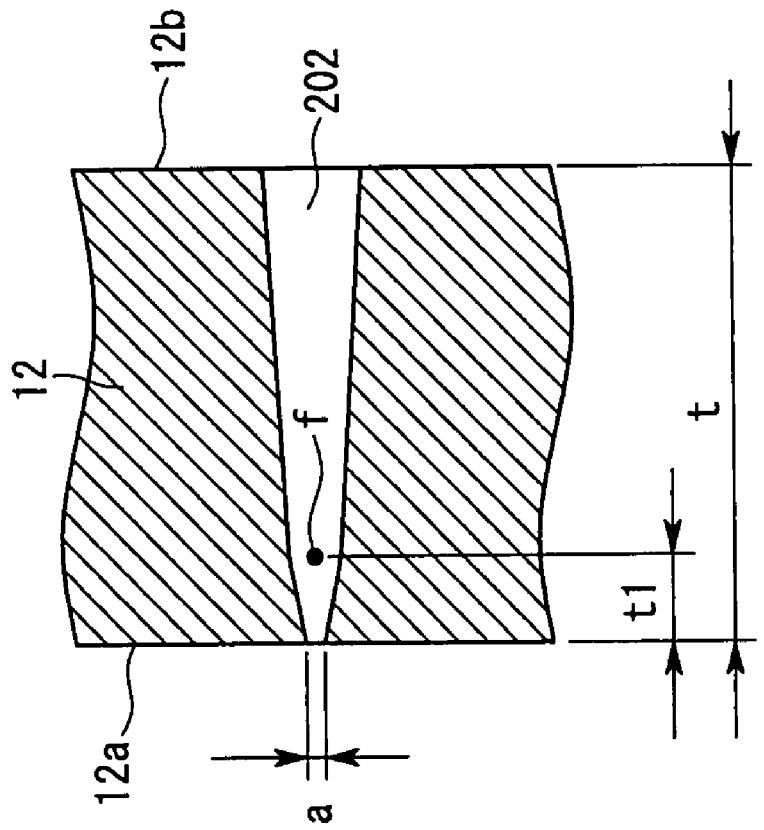
FIG. 9A is a cross-sectional view showing a minute hole formed in a relatively thin instrument panel.
Figure 9B:
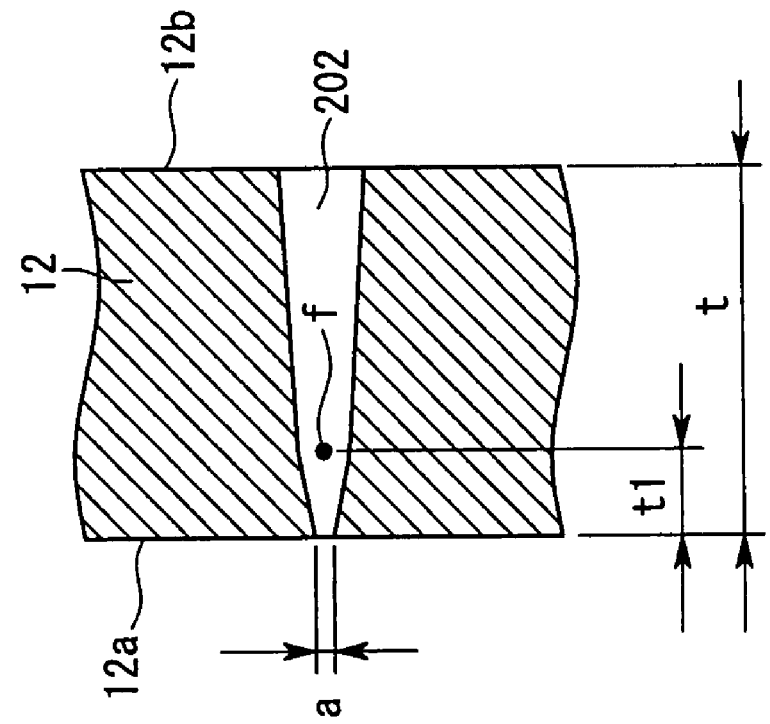
FIG. 9B is a cross-sectional view showing a minute hole formed in a relatively thick instrument panel.

The focal point f is set to the position at the depth t1, both when the thickness t of the instrument panel 12 is relatively small as shown in FIG. 9A, as well as when the thickness t of the instrument panel 12 is relatively large as shown in FIG. 9B. Therefore, the minute holes 202 are formed at least from the facing side 12a to the focal point f, are substantially identical in shape, and have substantially the same opening diameter a at the facing side 12a. Even when blind short pitch holes are formed, they are uniform in shape near the facing side 12a, regardless of the magnitude of the thickness t.

In the present embodiment, the robot 16 may double as a planar-direction moving mechanism, for relatively moving the focal point f in a plane along a processing zone, and also as an optical-axis-direction moving mechanism, for aligning the focal point f with the position at the depth t1 from the facing side 12a. The laser oscillator 20 may be fixed in position.

Alternatively, the robot 16 may operate as a planar-direction moving mechanism, whereas the laser oscillator 20 is moved as an optical-axis-direction moving mechanism. In this case, the laser oscillator 20 is moved linearly along the optical axis C by the error ϵ, so that the calculating and control procedures therefor are simple. The optical-axis-direction moving mechanism may alternatively comprise the lens 20d of the laser oscillator 20, which is moved along the optical axis C by a given actuator.

In the above description, the error ϵ is corrected in real time in step S6. However, the present invention is not necessarily limited to such a real-time process. Rather, the error ε may be determined only when each of the processing zones for the fragile region 200 starts being processed (step S5), wherein during the processing operation in step S6, the instrument panel 12 is corrected in position using a fixed offset value obtained based on the error ε. The error ε may also be determined each time the laser processing system 10 starts to operate, or for each lot of instrument panels 12.

The laser beam processing method and the interior member according to the second embodiment shall be described below with reference to FIGS. 10 through 19. According to the laser beam processing method, pulses having first and second pulse durations are alternately applied, so as to form deep main recesses and shallow auxiliary recesses in second opposite sides 210, 212, for thereby achieving an appropriate rupture strength. First opposite sides 204, 208 are irradiated with pulses having a relatively long cyclic period, resulting in a longer pitch. Therefore, the first opposite sides 204, 208 are less fragile, and are reliably bent when the air bag is expanded.

First, a fragile region 300, which is formed in the instrument panel 12 as an interior member by the laser beam processing method according to the second embodiment, shall be described below with reference to FIG. 10. The fragile region 300 corresponds to the fragile region 200, but differs therefrom in that it has short pitch holes (auxiliary recesses) 203. Those parts of the fragile region 300 which are identical to those of the fragile region 200 are denoted using identical reference characters.

As shown in FIG. 10, the fragile region 300 comprises a plurality of minute holes (main recesses) 202 and short pitch holes (auxiliary recesses) 203 arranged as an array of perforations. The laser processing system 10 bores the minute holes 202 with the laser beam, to thereby form the fragile region 300.

The fragile region 300 has an upper line 204 and a lower line 208 (first opposite sides), which are horizontally elongate and parallel to each other, a right line 210 and a left line 212, which interconnect both ends of the upper line 204 and the lower-line 208 thereby forming a rectangular shape, and a central line 206 disposed at an intermediate location between the upper line 204 and the lower line 208, and having both ends thereof connected to the right line 210 and the left line 212. The right line 210 and the left line 212 have upper and lower ends in a smooth arcuate shape, which are connected to the upper line 204 and the lower line 208. The fragile region 300 thus includes an upper area 214 and a lower area 216, with the central line 206 serving as a boundary therebetween, thereby providing double swing door panels.

On the upper line 204, the lower line 208, the right line 210, and the left line 212, which serve as outer edges of the fragile region 300, the minute holes 202 are provided at intervals represented by a given pitch P1. On the central line 206, the minute holes 202 are provided at intervals represented by a pitch P2, which is smaller than the given pitch P2. The upper line 204, the central line 206, and the lower line 208 are constructed only of the minute holes 202, whereas the right line 210 and the left line 212 are constructed by the minute holes 202, with short pitch holes 203 provided therebetween.

The minute holes 202 (see FIG. 17) extend through the base layer 28 and the skin layer 30, providing communication between the facing side 12a and the reverse side 12b of the instrument panel 12. The minute holes 202 are formed as tapered holes, having openings 202a at the facing side 12a, which are microscopic in terms of their area. The minute holes 202 need not necessarily extend through the instrument panel 12, but extend at least through the base layer 28.

The short pitch holes 203 (see FIG. 17) are formed as tapered bottomed holes, which are open only at the reverse side 12b. The short pitch holes 203 extend through the base layer 28 and have tip ends that slightly enter into the skin layer 30. The short pitch holes 203 are shallower than the minute holes 202, and do not extend through at least the skin layer 30. Since the minute holes 202 extend at least through the base layer 28, and the short pitch holes 203 do not extend through the skin layer 30, a substantial portion of the skin layer 30 remains unremoved, imparting a rupture strength to the fragile region 300 based on the properties of the skin layer 30.

In the vehicle, the air bag is accommodated near the fragile region 300 behind the reverse side 12b of the instrument panel 12. When the air bag is expanded, it pushes the reverse side 12b of the instrument panel 12, and initially engages the central area of the fragile region 300, thereby rupturing the central line 206. Thereafter, as the air bag is further expanded, the minute holes 202 join with each other spreading the crack until the crack reaches the right and left lines 210 and 212.

Since the right line 210 and the left line 212 include the short pitch holes 203, the right line 210 and the left line 212 have a relatively large fragility, thereby allowing the crack developed along the central line 206 to travel continuously vertically.

On the upper line 204 and the lower line 208, minute holes 202 are provided at intervals represented by the same pitch P1 as on the right line 210 and the left line 212, but short pitch holes 203 are not provided. The upper line 204 and the lower line 208 thus have a relatively small and appropriate fragility. Therefore, the crack traveling along the right line 210 and the left line 212 stops at the junctions thereof with the upper line 204 and the lower line 208, and then causes the upper line 204 and the lower line 208 to bend, due to the appropriate fragility thereof. In this manner, the upper area 214 opens upwardly, while the lower area 216 opens downwardly. The air bag inflates into the passenger compartment, and functions as a passenger cushion.

In FIG. 10, the minute holes 202 are shown as relatively large in diameter. Actually, however, the minute holes 202 have a diameter that is sufficiently small so as to be invisible (e.g., 100 μm or less). The broken lines shown in FIG. 10 are imaginary lines, to enable the viewer to more easily recognize the fragile region 300.

Figure 11:
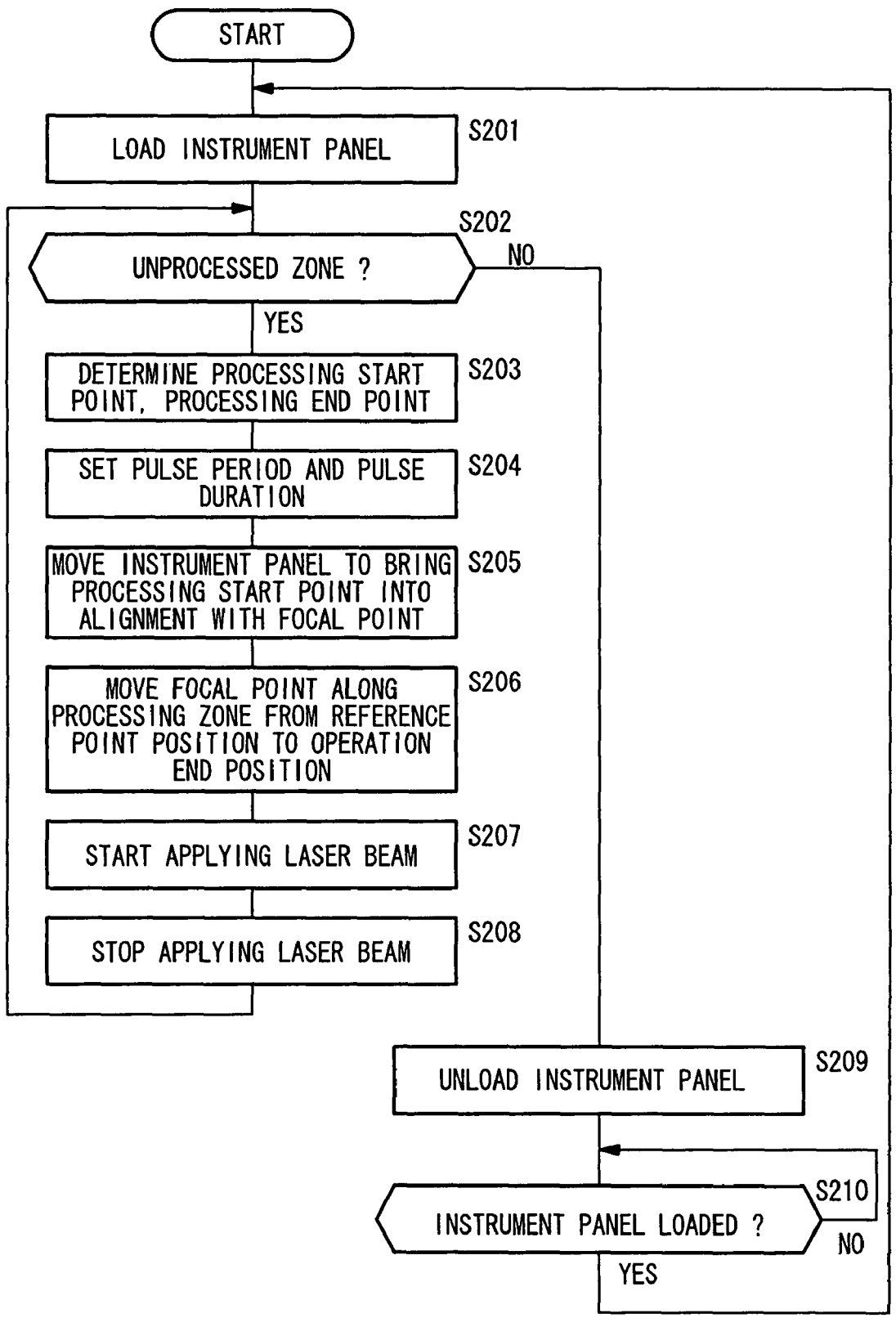
FIG. 11 is a flowchart of the sequence of a laser beam processing method according to the second embodiment.

A laser beam processing method according to the second embodiment, for forming the fragile region 300 in the instrument panel 12 with the laser processing system 10, shall be described below with reference to FIG. 11.

In step S201, the loading/unloading operation decision unit 100 operates the robot 16, so as to move an instrument panel 12, which has been loaded by the loading line 18a and held by the end effector 16a, to the processing position P. At this time, the robot 16 moves the instrument panel 12 while the instrument panel 12 is oriented with the reverse side 12b thereof facing toward the laser oscillator 20.

In step S202, the processing zone selector 104 confirms whether the fragile region 300 includes an unprocessed zone therein or not. If the fragile region 300 includes an unprocessed zone, then that zone is identified as the next zone to be processed, and control returns to step S3. If all zones within the fragile region 300 are determined to have been processed, control then proceeds to step S210.

In step S203, the reference point identifier 106 and the operation end point identifier 108 identify a processing start point B and a processing end point E, respectively, for the next zone to be processed.

In step S204, the laser irradiation decision unit 56 establishes a pulse period and a pulse duration for the next zone to be processed, while referring to the pulse period data 56*a* and the pulse duration data 56*b*. Pulses in the pattern thereby established will actually be applied in step S207.

In step S205, the processing zone transition operation decision unit 112 defines the movement of the robot 16, and moves the instrument panel 12 so that the processing start point B is aligned with the focal point f.

In step S206, the processing zone operation decision unit 110 defines the movement of the robot 16 in order to move the instrument panel 12 at a predetermined moving speed V, thereby relatively moving the focal point f along the processing zone from the processing start point B to the processing end point E.

In step S207, the processing zone operation decision unit 110 controls the laser irradiation start/end instruction unit 116, so as to instruct the laser controller 26 to enable the laser oscillator 20 to begin applying the laser beam to the instrument panel 12. The laser beam is applied in pulses to the instrument panel 12, based on the pulse period and the pulse duration established in step S204.

Figure 12:
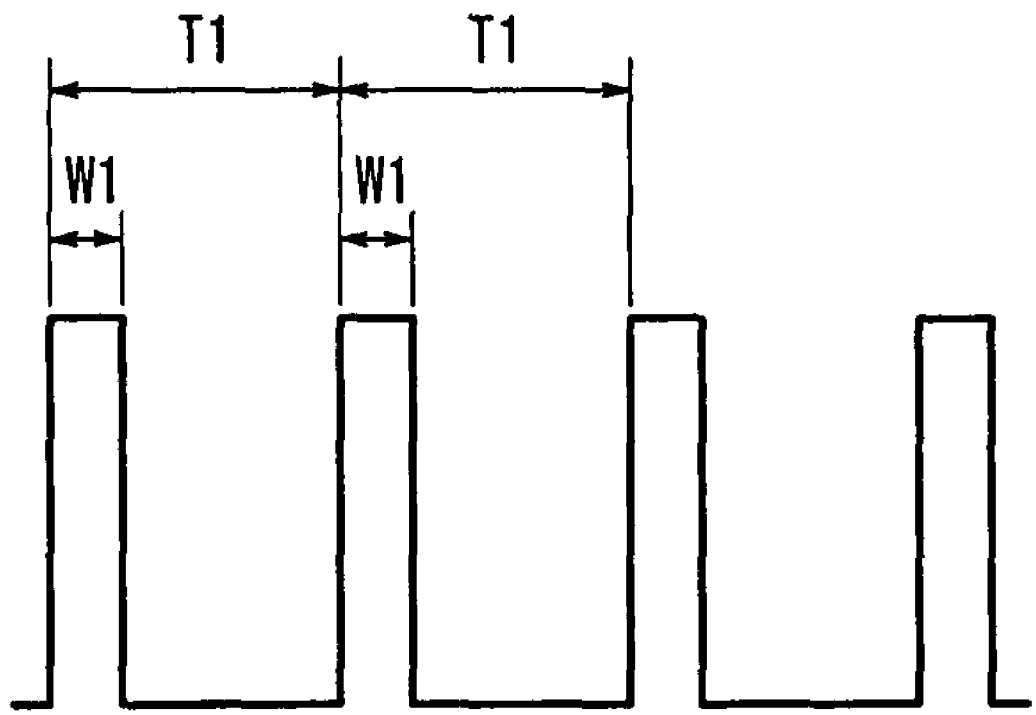
FIG. 12 shows the waveform of pulses applied to form an upper line and a lower line.
Figure 13:
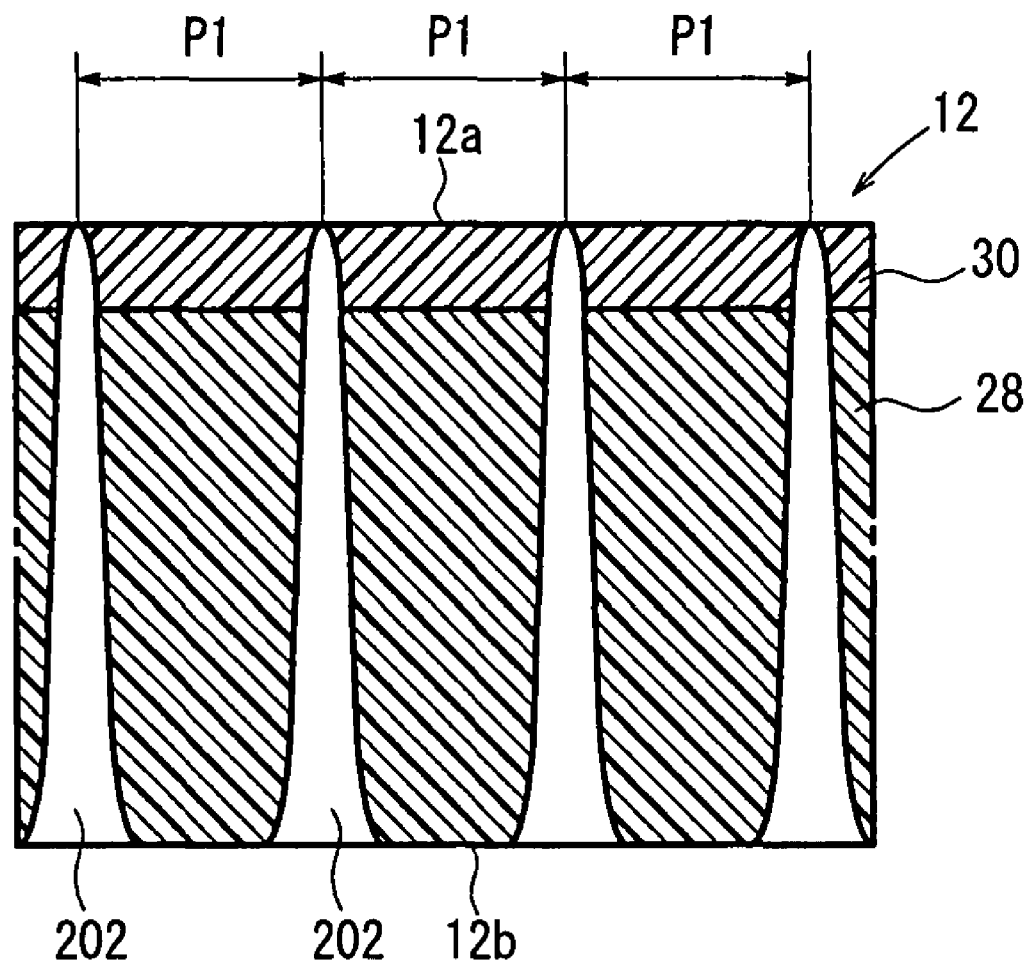
FIG. 13 is a cross-sectional view of the formed upper line and lower line.

Specifically, in order to process the zones of the upper line 204 and the lower line 208, as shown in FIG. 12, the laser is applied in pulses having a relatively long cyclic period (first period) T1, and a relatively long pulse duration (first pulse duration) W1. The cyclic period T1 is expressed as T1=P1/V. As shown in FIG. 13, the applied pulses form the upper line 204 and the lower line 208 as a series of minute holes 202 in the instrument panel 12, which are arrayed at the pitch P1. By appropriately establishing the pulse duration W1, the minute holes 202 extend through the instrument panel 12, whereas the openings 202*a* of the minute holes 202 on the facing side 12*a* are microscopic in terms of area, thereby providing a desired level of quality in appearance.

Figure 14:
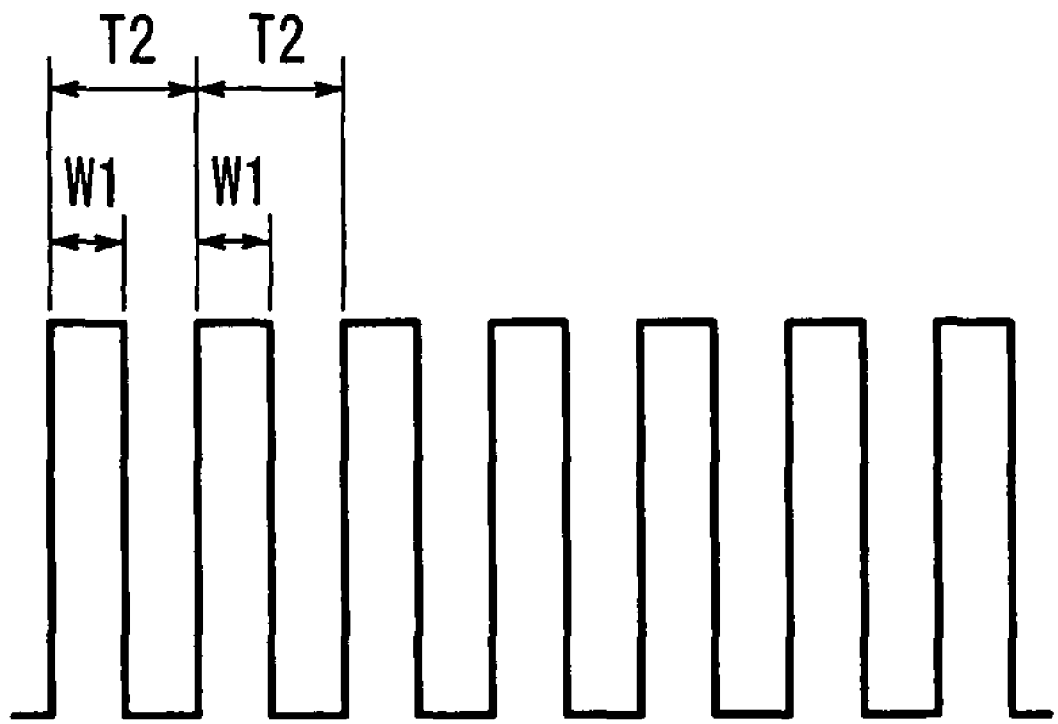
FIG. 14 shows the waveform of pulses applied to form a central line.
Figure 15:
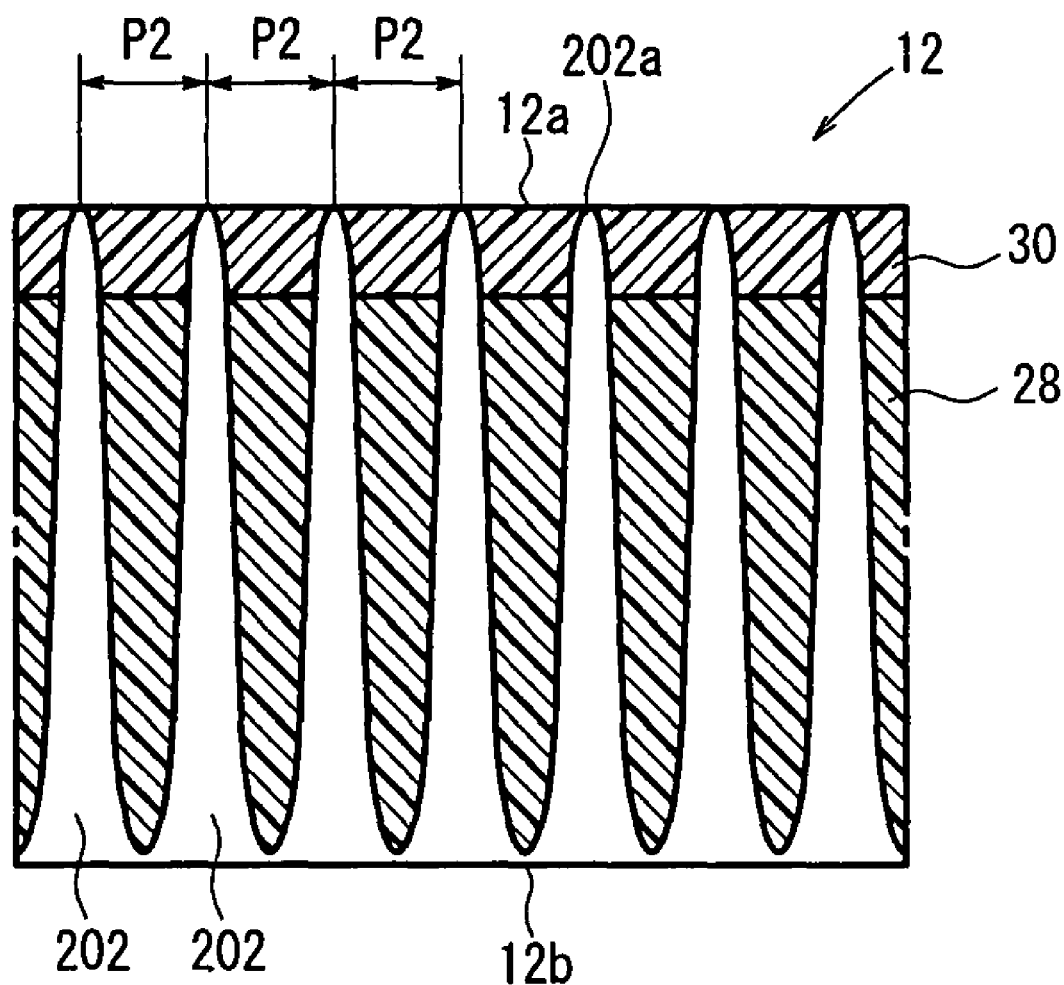
FIG. 15 is a cross-sectional view of the formed central line.

For processing the zone of the central line 206, as shown in FIG. 14, the laser is applied in pulses having a relatively short cyclic period (second period) T2 and at the pulse duration W1. The cyclic period T2 is expressed as T2=P2/V. As shown in FIG. 15, the applied pulses form the central line 206 as a series of minute holes 202 in the instrument panel 12, which are arrayed at the pitch P2.

Figure 16:
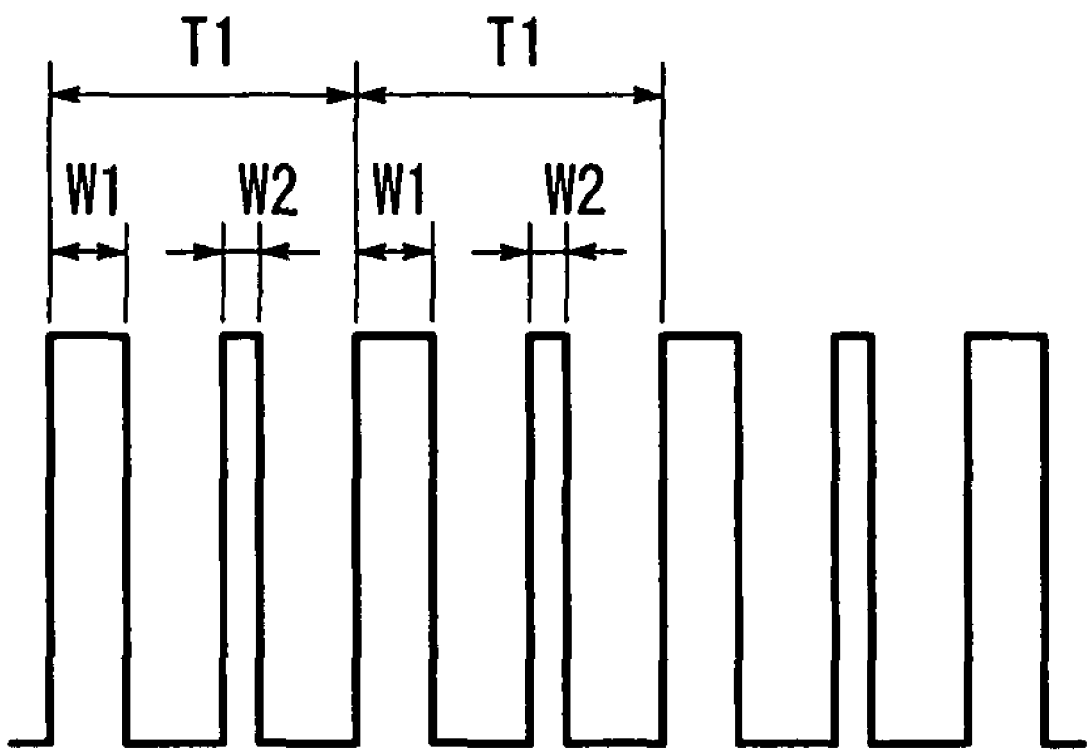
FIG. 16 shows the waveform of pulses applied to form a right line and a left line.
Figure 17:
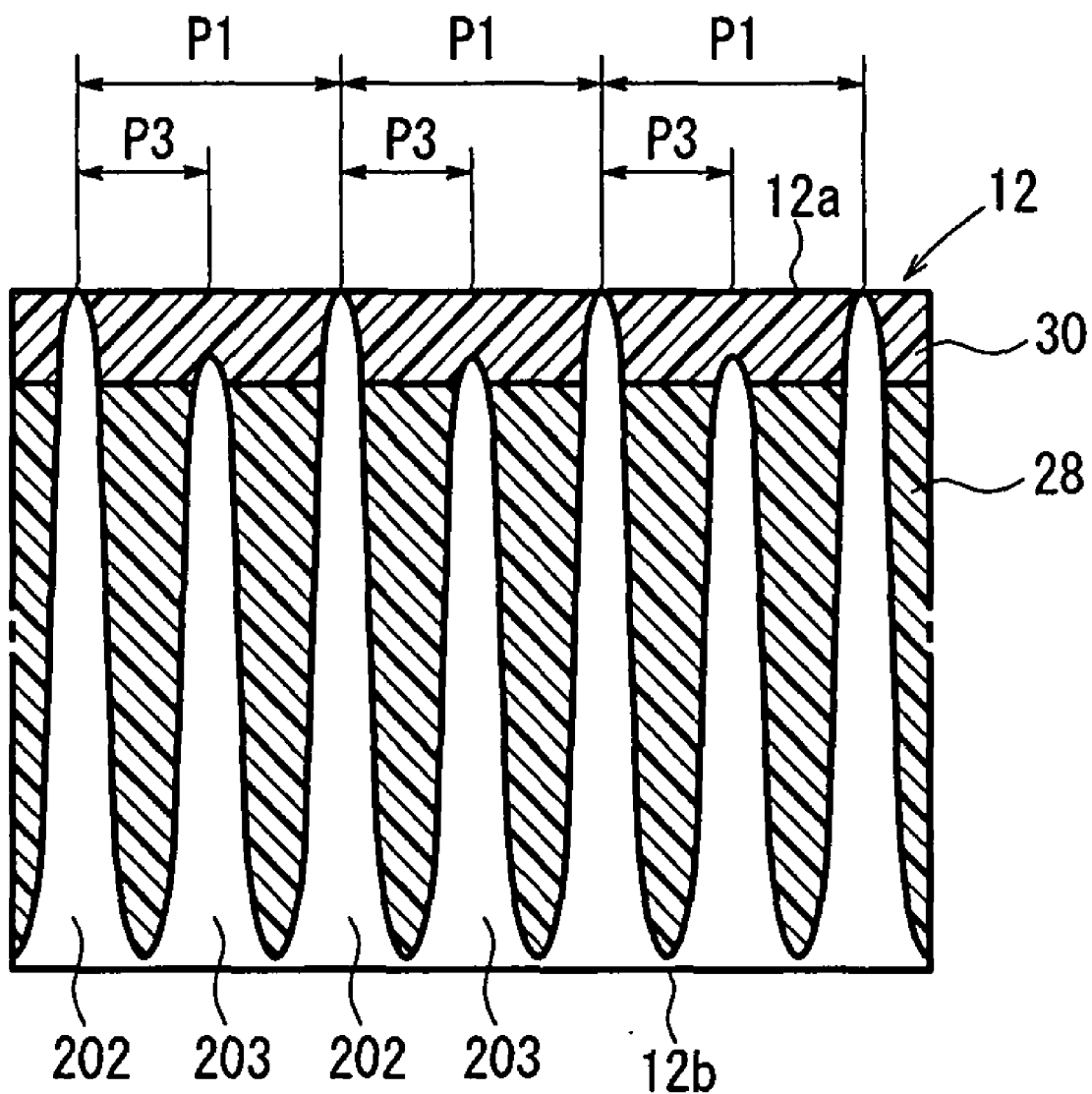
FIG. 17 is a cross-sectional view of the formed right line and left line.

For processing the zones of the right line 210 and the left line 212, as shown in FIG. 16, the laser is applied thereto in alternate pulses, having the pulse duration W1 and a relatively short pulse duration (second pulse duration) W2. Each of the pulses at the pulse duration W2 is applied at an intermediate time within the interval during which the pulses at the pulse duration W1 are applied. As shown in FIG. 17, the pulses form relatively shallow short pitch holes 203 at an intermediate location between the minute holes 202, which are arrayed at the pitch P1. The minute holes 202 and the short pitch holes 203 have a pitch P3, expressed as P3=P1/2. By appropriately establishing the pulse duration W2, the short pitch holes 203 do not extend through the instrument panel 12, and the tip ends thereof enter only slightly into the skin layer 30.

Figure 18:
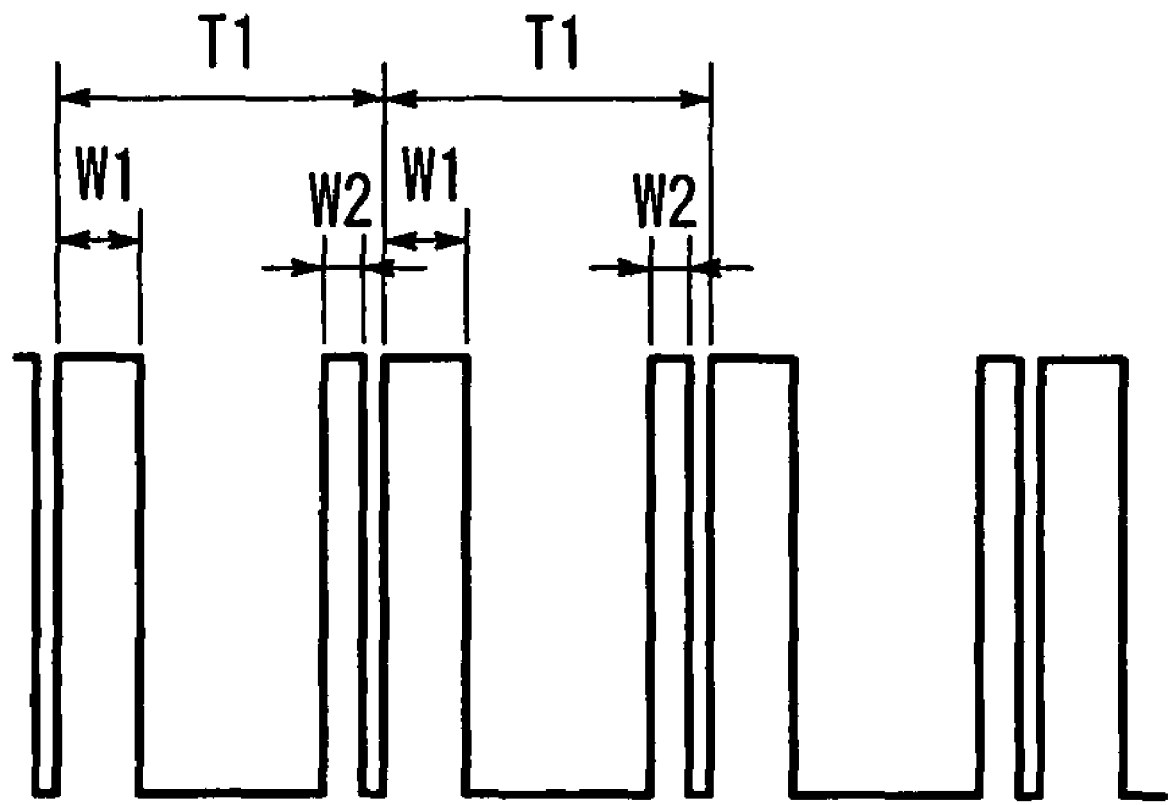
FIG. 18 shows a modification of the pulse waveform applied to form a right line and a left line.
Figure 19:
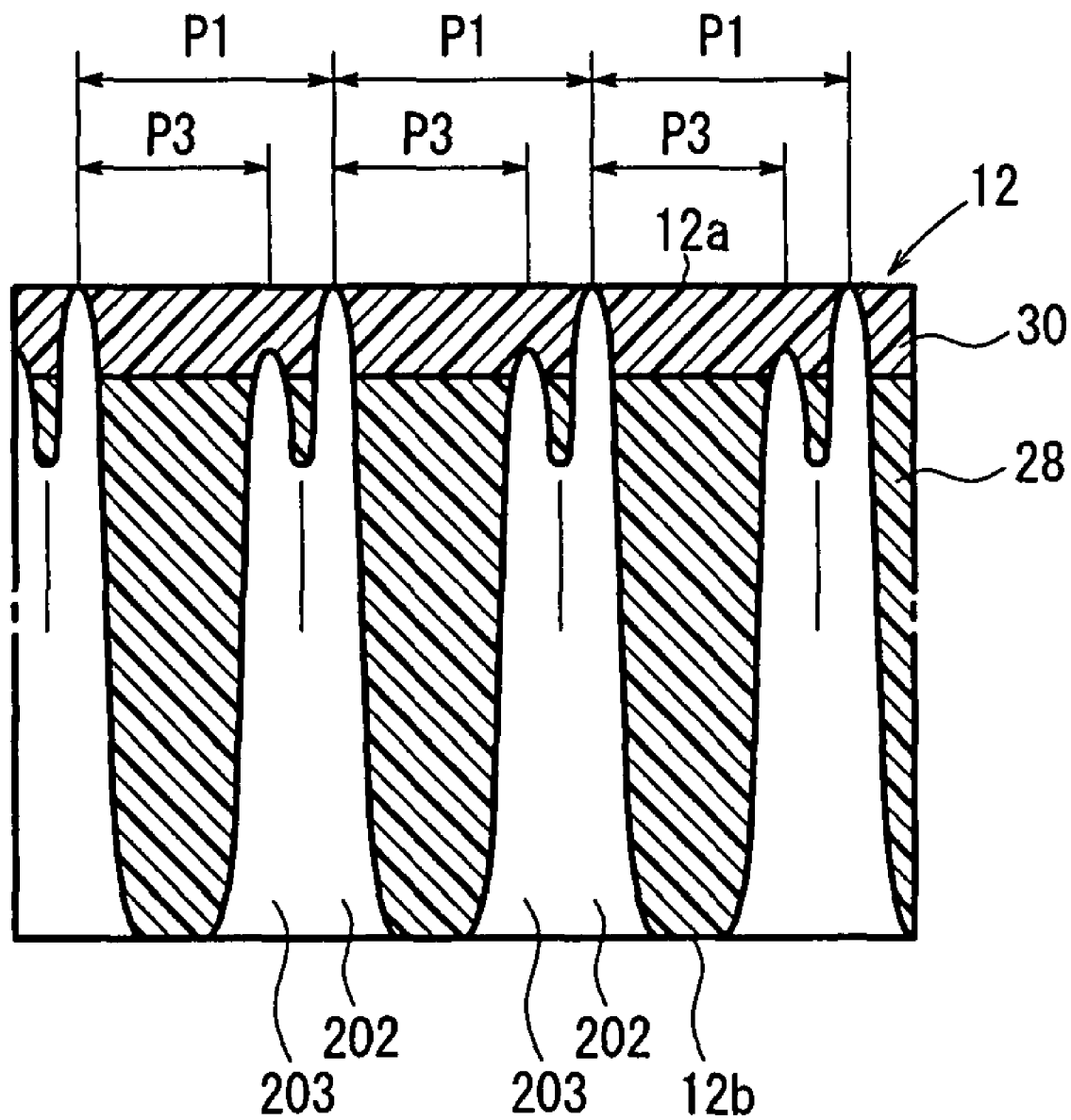
FIG. 19 is a cross-sectional view of the right line and the left line, which are formed in accordance with the modification.

As shown in FIG. 18, each of the pulses having the pulse duration W2 may be applied more closely to either one of the adjacent pulses having the pulse duration W1. In this case, as shown in FIG. 19, the minute holes 202 and the short pitch holes 203 are formed in an overlapping manner, so that the instrument panel 12 has a greater unprocessed cross-sectional area than the case shown in FIG. 17, resulting in a greater rupture strength. Accordingly, by adjusting the intervals at which the pulses of the pulse duration W1 and the pulses of the pulse duration W2 are applied, it is possible to adjust the rupture strength of the corresponding zone.

In step S208, when the focal point f reaches the processing end point E, the processing zone operation decision unit 110 controls the laser irradiation start/end instruction unit 116 to instruct the laser controller 26 and cause the laser oscillator 20 to stop applying the laser beam to the instrument panel 12. Thereafter, control returns to step S202. If there are any unprocessed zones remaining, such zones are continuously processed.

In step S209 (after all zones of the fragile region 300 have been processed), the loading/unloading operation decision unit 100 operates the robot 16 to place the processed instrument panel 12 onto the unloading line 18*b*, whereupon the instrument panel 12 is unloaded and transported to the next process.

Thereafter, in step S210, control waits until an unprocessed instrument panel 12 is loaded from the loading line 18*a*. Control then returns to step S201 when loading of the unprocessed instrument panel 12 has been confirmed.

As described above, each of the right line 210 and the left line 212 of the fragile region 300 is constructed of an alternate array of minute holes 202 and short pitch holes 203, which have different depths, thus providing an appropriate rupture strength. Specifically, the right line 210 and the left line 212 are set to provide the same tensile strength as the central line 206. The tensile strength can easily be adjusted by not only changing the processing pitch, but also by changing the amount of irradiation (i.e., the processing depth) per pulse.

On the right line 210 and on the left line 212, the cross-sectional area of the unprocessed portion of the skin layer 30 is greater than on the central line 206. After a crack has developed in the base layer 28 when the air bag is expanded, the right line 210 and the left line 212 do not immediately open, since the skin layer 30 develops substantial toughness as a property thereof. Therefore, the central line 206 opens first according to the scheduled sequence. Since the ends of the right line 210 and the left line 212 are formed in a smooth arcuate shape, opening forces are reliably transmitted to the upper line 204 and the lower line 208.

On the right line 210 and on the left line 212, both minute holes 202 and short pitch holes 203 are formed simply by alternately applying pulses of the pulse durations W1 and W2, i.e., basically by controlling the laser beam so as to be turned on and off. The intensity of the laser beam and the moving speed V may be constant, and hence a complex laser energy control system and a moving speed changing control system are not required.

On the upper line 204 and on the lower line 208, the minute holes 202 are formed at the same pitch interval as the pitch P1 on the right line 210 and the left line 212. However, since the upper line 204 and the lower line 208 are free of the short pitch holes, they have a sufficiently large cross-sectional area. Therefore, the upper line 204 and the lower line 208 will not become deformed earlier than the right line 210 and the left line 212. Opening forces are transmitted from the right line 210 and the left line 212 to the upper line 204 and the lower line 208, such that when the air bag is expanded to open the upper area 214 and the lower area 216, the upper line 204 and the lower line 208 are bent reliably.

Inasmuch as the pulse period and the pulse duration for each of the processing zones of the fragile region 300 are set individually by the laser irradiation decision unit 56, a rupture strength that is suitable for each processing zone can be established individually, while the processing method is simple to carry out.

The laser beam processing method and the interior member according to the third embodiment shall be described below with reference to FIGS. 20 through 22. According to the laser beam processing method, the robot 16 is operated to bring the focal point f toward the processing start point, thereby stabilizing the operating speed and relative moving speed of the robot 16. Thereafter, the laser beam begins being applied for producing a fragile region having a uniform shape.

A processing start point B1 and a processing end point E1 of a fragile region 200, which is formed by the laser beam processing method according to the third embodiment, shall be described in detail with reference to FIGS. 20 and 21. The fragile region 200, including the processing start point B1 and the processing end point E1, is identical to the fragile region 200 formed by the laser beam processing method according to the second embodiment.

Figure 20:
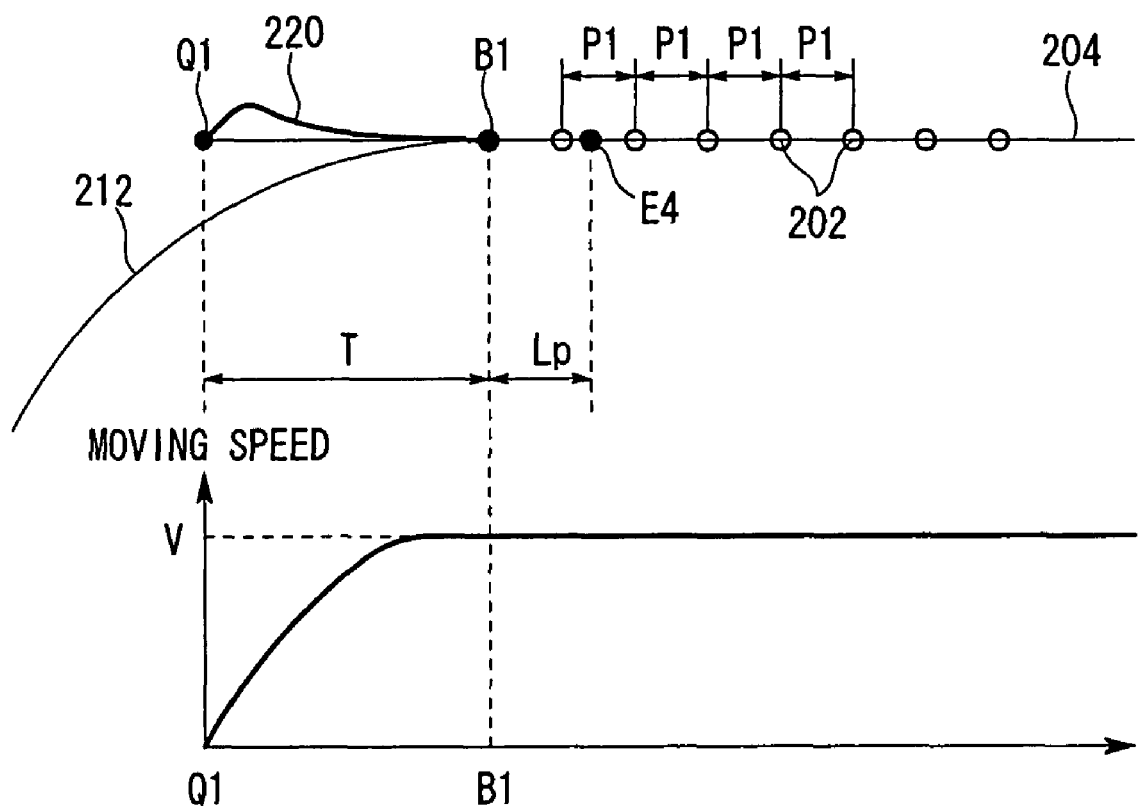
FIG. 20 is a diagram showing the relationship between an upper line portion near a processing start point and moving speed.

As shown in FIG. 20, a processing start point B1 of a linear upper line 204, forming one of a plurality of processing zones, is set at an end (left end in FIG. 20) of the linear part that defines the upper line 204. An actual processing sequence starts from the processing start point B1 toward a processing end point E1 (to the right in FIG. 20). An operation preparing point Q1 is spaced from the processing start point B1, in a direction opposite to the processing direction (to the left in FIG. 20) by a predetermined run-up distance. The area between the operation preparing point Q1 and the processing start point B1 is defined as a run-up interval T. The operation preparing point Q1 is set as a point on an extension line along the direction in which the corresponding zone of the fragile region 200 extends from the processing start point B1. If an end where the process starts in the processing zone is curved, then the operation preparing point Q1 may be provided on a line tangential to the end where the process starts. By setting the operation preparing point Q1 as a point on an extension line along the direction in which the fragile region 200 extends from the processing start point B1, the movement direction of the robot 16 and the focal point f is stabilized to produce the fragile region 200 having an appropriate shape.

The run-up interval T is a zone provided to stabilize the operating speed of the robot 16 at the time that the robot 16 starts operating, and also to accelerate the moving speed of the focal point f and stabilize the moving speed of the focal point f at the given moving speed V. The run-up interval T has a length determined depending on the operating characteristics of the robot 16. A run-up interval T is established for each of the processing start points Bn of the processing zones.

Figure 21:
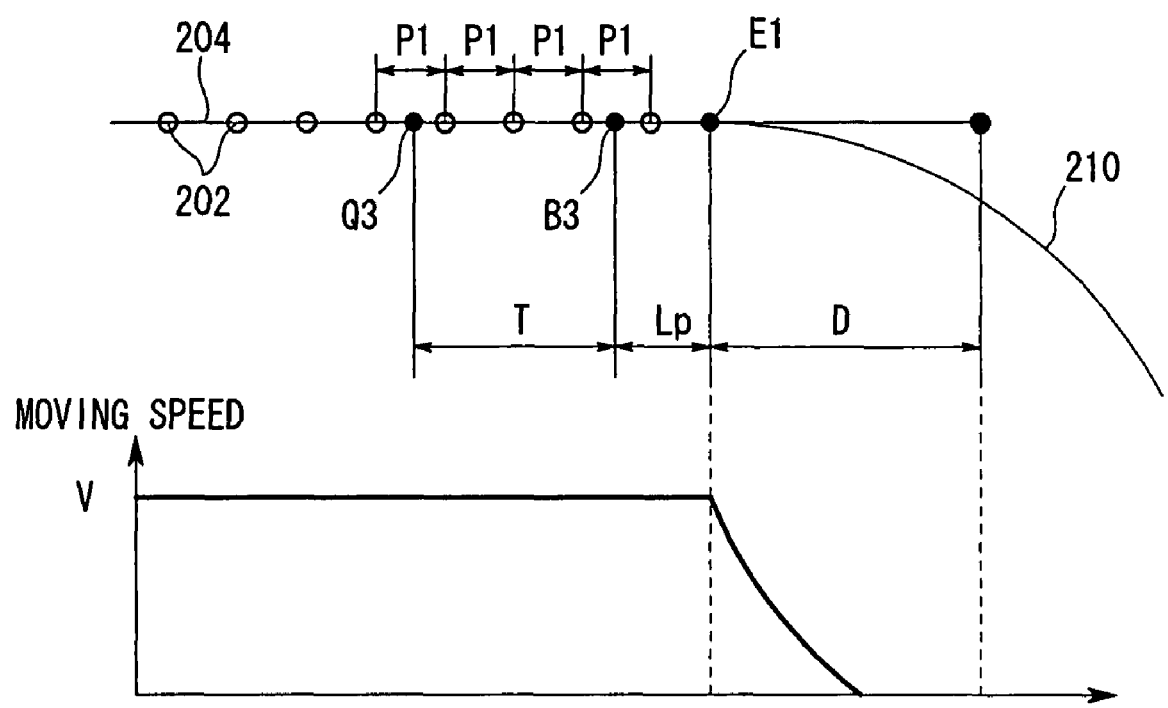
FIG. 21 is a diagram showing the relationship between an upper line portion near a processing end point and moving speed.
Figure 22:
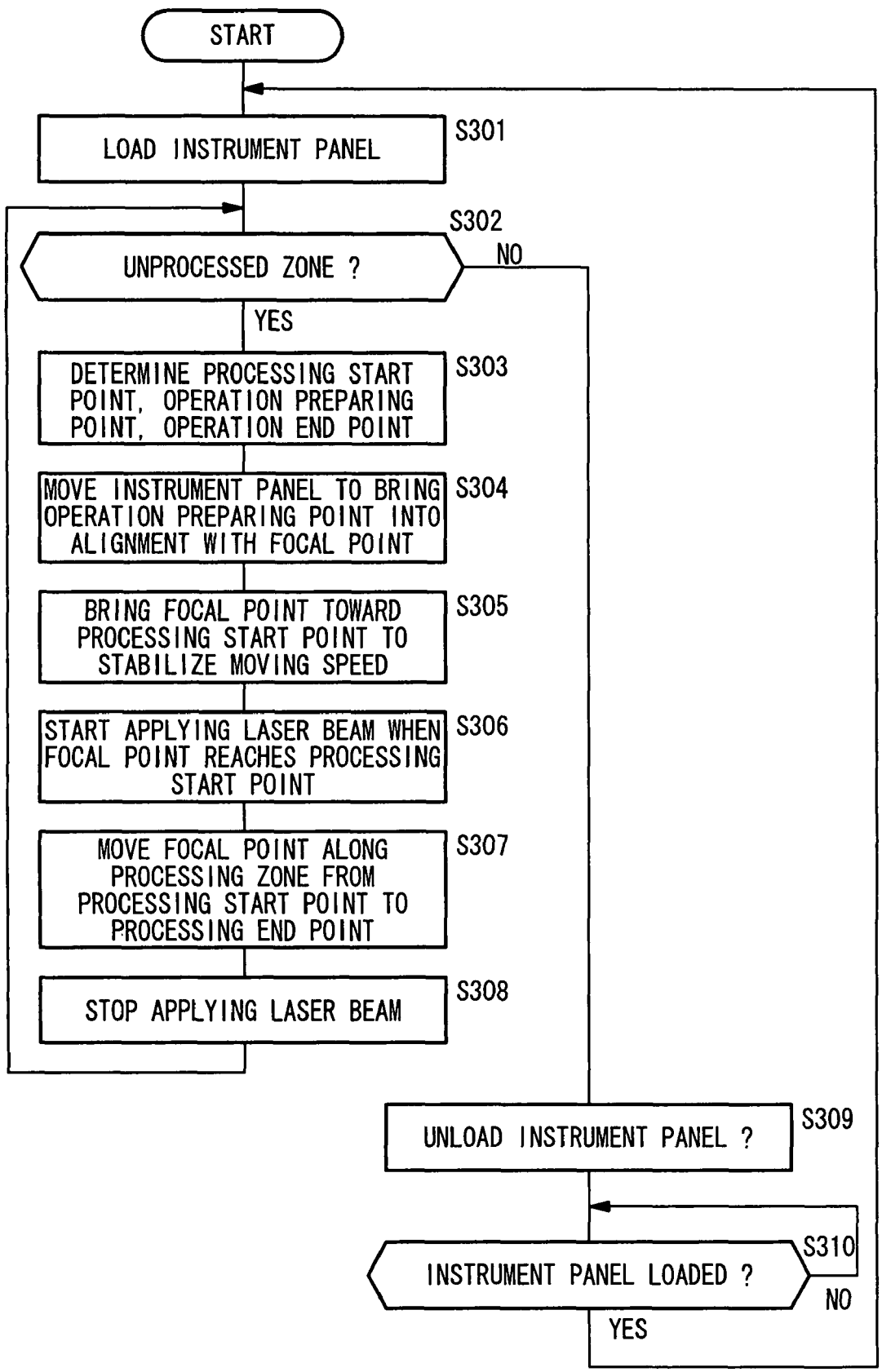
FIG. 22 is a flowchart of the sequence of a laser beam processing method according to a third embodiment.

As shown in FIG. 21, a processing end point E1 of the linear upper line 204 of a plurality of processing zones is set to an opposite end (right end in FIG. 21) of the linear part, which is opposite to the processing start point B1. The actual processing sequence ends at the processing end point E1. The processing end point E1 is aligned with a point on the arcuate end of the right line 210. The laser beam stops being applied at the processing end point E1, whereupon the robot 16 stops being operated thereby terminating the processing sequence. Since the robot 16 moves at a constant moving speed V while processing the upper line 204, the robot 16 moves slightly by inertia and stops within a decelerating interval D, even though the robot 16 is instructed to stop at the processing end point E1.

A processing start point B3 for the right line 210 is positioned slightly to the left of the processing start point B1 on the upper arcuate end, and an operation preparing point Q3 is positioned further to the left of the processing start point B3. A lapping interval Lp between the processing start point B3 and the processing end point E1 is processed in an overlapping manner when the upper line 204 is processed and when the right line 210 is processed. The length of the lapping interval Lp is set to at least the pitch P1. Since the upper line 204 and the right line 210 overlap each other by at least one pitch, the upper line 204 and the right line 210 are reliably connected to each other. Therefore, when the air bag expands and ruptures the right line 210, the rupturing forces are reliably transmitted to the upper line 204 to bend the upper line 204.

As shown in FIG. 20, a lapping interval Lp also is provided on the left end of the upper line 204, wherein a processing end point E4 is positioned to the right of the processing start point B1. A similar lapping interval Lp also is provided on both ends of the lower line 208. In each of these areas, the lapping interval Lp is disposed between the processing start point Bn of one of two adjacent processing zones and the processing end point En of the other of the two adjacent processing zones. The central line 206 does not require a lapping interval Lp, since the ends thereof are joined, as T-joints, at the centers of the left line 212 and the right line 210 respectively. However, if the central line 206 is constructed from two left and right processing zones, then a lapping interval Lp may be provided at the joint between the left and right processing zones.

The laser beam processing method according to the third embodiment, for forming the fragile region 200 in the instrument panel 12 with the laser processing system 10, shall be described below with reference to FIG. 22.

In step S301, the loading/unloading operation decision unit 100 operates the robot 16 to move an instrument panel 12, which has been loaded by the loading line 18a and is held by the end effector 16a, to the processing position P. At this time, the robot 16 moves the instrument panel 12 while the instrument panel 12 is oriented with the reverse side 12b thereof facing toward the laser oscillator 20.

In step S302, the processing zone selector 104 confirms whether or not the fragile region 300 includes an unprocessed zone therein. If the fragile region 200 includes an unprocessed zone, then a next zone to be processed is identified, and control proceeds to step S303. If it is determined that all of the zones within the fragile region 200 have been processed, then control proceeds to step S309.

In step S303, the reference point identifier 106 and the operation end point identifier 108 determine a processing start point Bn, an operation preparing point Qn, and a processing end point En, for the next zone to be processed.

In step S304, the processing zone transition operation decision unit 112 defines the movement of the robot 16, and moves the instrument panel 12 so that the focal point f is placed in alignment with the operation preparing point Qn. At this time, the laser beam is not applied. After the focal point f is placed in alignment with the operation preparing point Qn, the robot 16 is temporarily stopped.

In step S305, the robot 16 begins operating to move the moving mechanism and bring the focal point f toward the processing start point Bn, wherein movement of the focal point f based on the movement of the robot 16 is accelerated and stabilized, in order to maintain a prescribed moving speed V, as shown in FIG. 20.

The robot 16 has a 6-axis configuration, wherein the trajectory 220 (see FIG. 20) of the focal point f tends to be slightly displaced from a straight path during the run-up interval T, due to the different operating characteristics of the axes of the robot 16, at the time that the robot 16 starts to operate. However, the operating characteristics of the axes become stabilized over time, such that once the focal point f reaches the processing start point Bn in the run-up interval T, the focal point f moves accurately along the straight path. Since recently available robots 16 exhibit excellent operating characteristics, with operating speeds that are stabilized relatively instantaneously, the run-up interval T does not need to be excessively long.

In step S306, when the focal point f reaches the processing start point Bn, the laser oscillator 20 emits a laser beam so as to begin processing the fragile region 200 (e.g., the upper line 204). At this time, since the focal point f is moved accurately at the moving speed V, the laser oscillator 20 applies the laser beam in pulses having a constant cyclic period (e.g., P1/V or P2/V), to form minute holes 202 having a uniform pitch P1 or P2 along an expected route within the instrument panel 12.

Thereafter, in step S307, the processing zone operation decision unit 110 defines the movement of the robot 16, so as to move the instrument panel 12 at a predetermined moving speed V, thereby relatively moving the focal point f along the processing zone from the processing start point Bn to the processing end point En.

In step S308, when the focal point f reaches the processing end point En, the processing zone operation decision unit 110 controls the laser irradiation start/end instruction unit 116 to instruct the laser controller 26 and cause the laser oscillator 20 to stop applying the laser beam to the instrument panel 12. At this time, the lapping interval Lp is processed, reliably connecting the processed zone to an adjacent processing zone.

The robot controller 24 gives a shutdown instruction in order to stop the robot 16. Since the robot 16 continues to move slightly by inertia, the focal point f moves somewhat beyond the processing end point En, and stops within the decelerating interval D, as shown in FIG. 21.

Thereafter, control returns to step S302. If there are any unprocessed zones remaining, then such zones are continuously processed.

In step S309 (when all zones of the fragile region 300 have been processed), the loading/unloading operation decision unit 100 operates the robot 16, so as to place the processed instrument panel 12 onto the unloading line 18b, whereby the instrument panel 12 is unloaded and transported to a subsequent process.

Thereafter, in step S310, the control waits until an unprocessed instrument panel 12 is loaded from the loading line 18a. Control then returns to step S301 when loading of an unprocessed instrument panel 12 has been confirmed.

As described above, with the laser beam processing method for processing an interior member according to the present embodiment, the robot 16 is operated to bring the processing start point Bn toward the focal point f, for thereby establishing a run-up interval T required to accelerate the robot 16. When the focal point f reaches the processing start point Bn, the focal point f acquires a stable moving speed V based on operation of the robot 16. Therefore, when the laser oscillator 20 applies the laser beam, after the focal point f has reached the processing start point Bn, minute holes 202 having a uniform shape are formed at a uniform pitch.

The invention claimed is:

1. A laser beam processing method for processing an interior member for covering an air bag accommodated therein, with a laser beam emitted from a laser oscillator to form a linear fragile region, which is ruptured when the air bag accommodated therein is expanded, comprising:

a first step of measuring a position of a first surface of said interior member, which serves as a facing side when said interior member is installed in a vehicle;

a second step of adjusting a position of a focal point of said laser beam so as to come into alignment with a position at a predetermined depth from said first surface, based on a measured result from said first step; and a third step of applying said laser beam to a second surface of said interior member, which serves as a reverse side when said interior member is installed in the vehicle, thereby forming at least a portion of said fragile region;

wherein said interior member and said laser oscillator are moved relatively by a programmable moving mechanism.

2. A laser beam processing method according to claim 1, wherein in said second step, a position of said interior member or said laser oscillator that emits said laser beam is moved in order to change a relative distance between said interior member and said laser oscillator, thereby adjusting the focal point of said laser beam.

3. A laser beam processing method according to claim 1, wherein in said second step, an optical system of said laser oscillator that emits said laser beam is moved in order to adjust the focal point of said laser beam.

4. A laser beam processing method according to claim 1, wherein said fragile region is constructed of a series of plural minute recesses comprising substantially parallel first opposite sides, and substantially parallel second opposite sides that interconnect both ends of said first opposite sides, thereby forming a rectangular shape, and a central line disposed at an intermediate location between the first opposite sides and having both ends thereof connected to the second opposite sides, said laser beam processing method comprising the steps of:

applying the laser beam in pulses having a first cyclic period and a first pulse duration, thereby forming said first opposite sides;

applying the laser beam in pulses having a second cyclic period, which is shorter than said first cyclic period, and said first pulse duration, thereby forming said central line; and applying the laser beam in alternate pulses having said first pulse duration and a second pulse duration, which is shorter than said first pulse duration, thereby forming said second opposite sides.

5. A laser beam processing method according to claim 1, comprising the steps of:

positioning the focal point of said laser beam at an operation preparing point, which is spaced, in a direction opposite to the direction in which the interior member is processed, from an initial processing start point at which at least a portion of said fragile region is formed;

bringing said focal point toward said processing start point to stabilize a moving speed thereof; and emitting the laser beam from said laser oscillator to begin processing of said fragile region, after said focal point has reached said processing start point.

* * * * *